US012772245B2

(12) United States Patent
Yamamoto et al.

(10) Patent No.: US 12,772,245 B2
(45) **Date of Patent: *Oct. 20, 2026**

(54) TERMINAL, BASE STATION, AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 18/823,255

(22) Filed: Sep. 3, 2024

(65) Prior Publication Data

US 2024/0422783 A1 Dec. 19, 2024

Related U.S. Application Data

(63) Continuation of application No. 18/503,931, filed on Nov. 7, 2023, now Pat. No. 12,114,311, which is a (Continued)

(30) Foreign Application Priority Data

Jul. 25, 2018 (JP) ................................ 2018-139337
Oct. 26, 2018 (JP) ................................ 2018-202046

(51) Int. Cl.
*H04L 5/00* (2006.01)
*H04W 72/20* (2023.01)

(52) U.S. Cl.
CPC .......... *H04W 72/20* (2023.01); *H04L 5/0055* (2013.01)

(58) Field of Classification Search
None
See application file for complete search history.

(56) References Cited

U.S. PATENT DOCUMENTS 10,644,841 B2 5/2020 Takeda et al.
11,737,032 B2 8/2023 Jeon et al.

(Continued)

FOREIGN PATENT DOCUMENTS

CN 107801246 A 3/2018
JP 2018139337 A 9/2018
JP 2018202046 A 12/2018

OTHER PUBLICATIONS

3GPP TS 38.211 V15.2.0, "3rd Generation Partnership Project; Technical Specification Group Radio Access Network; NR; Physical channels and modulation (Release 15)," Jun. 2018, 96 pages.

(Continued)

*Primary Examiner* — Nguyen H Ngo
(74) *Attorney, Agent, or Firm* — Seed Intellectual Property Law Group LLP

(57) ABSTRACT

A terminal with which it is possible to appropriately transmit uplink control information. In a terminal (200), a reception unit (202) receives first control information relating to an uplink data channel, and a second control information relating to an uplink control channel for transmitting uplink control information. The first control information includes first indication information indicating the presence or absence of an uplink data transmission and second indication information indicating the presence or absence a channel state information transmission. A transmission unit (220) transmits uplink control information using the resource of the uplink data channel when the first indication information (Continued)

indicates that there is no uplink data transmission and the second indication information indicates that there is no channel state information transmission.

4 Claims, 19 Drawing Sheets

Related U.S. Application Data continuation of application No. 17/262,152, filed as application No. PCT/JP2019/012434 on Mar. 25, 2019, now Pat. No. 11,849,451.

(56) References Cited

U.S. PATENT DOCUMENTS

| | | | | |
|---|---|---|---|---|
| 2012/0230268 | A1* | 9/2012 | Marinier | H04B 7/0626 370/329 |
| 2013/0039272 | A1* | 2/2013 | Chen | H04W 76/25 370/328 |
| 2013/0163571 | A1* | 6/2013 | Ouchi | H04W 72/23 370/336 |
| 2018/0167932 | A1 | 6/2018 | Papasakellariou | |
| 2019/0215897 | A1* | 7/2019 | Babaei | H04W 76/28 |
| 2019/0349147 | A1 | 11/2019 | Aiba et al. | |

OTHER PUBLICATIONS

3GPP TS 38.212 V15.2.0, "3rd Generation Partnership Project; Technical Specification Group Radio Access Network; NR; Multiplexing and channel coding (Release 15)," Jun. 2018. (98 pages).

3GPP TS 38.213 V15.2.0 "3rd Generation Partnership Project; Technical Specification Group Radio Access Network; NR; Physical layer procedures for control (Release 15)," Jun. 2018. (99 pages).

3GPP TS 38.214 V15.2.0, "3rd Generation Partnership Project; Technical Specification Group Radio Access Network; NR; Physical layer procedures for data (Release 15)," Jun. 2018, 95 pages.

3GPP, 3rd Generation Partnership Project; Technical Specification Group Radio Access Network; NR; Physical layer procedures for control (Release 15), 3GPP TS 38.213 V1.3.0, Dec. 2017. (58 pages).

English Translation of Chinese Search Report dated Dec. 12, 2023, for the corresponding Chinese Patent Application No. 2019800490514, 4 pages.

Extended European Search Report, dated Sep. 6, 2021, for European Application No. 19840694.4-1215, 13 pages.

Huawei, "CR to 38.212 capturing the RAN1 #92bis and RAN1#93 agreements," R1-18xxxxx, 3GPP TSG RAN WG1 Meeting #93, Busan, Korea, May 21-25, 2018. (34 pages).

Huawei, "CR to 38.212 capturing the RAN1#92bis and RAN1#93 meeting agreements," R1-1807956, Change Request, 38.212, CR0002, rev 1, Current Version: 15.1.1, 3GPP TSG RAN WG1 Meeting #93, Busan, Korea, May 21-25, 2018, 31 pages.

International Search Report, mailed Jun. 11, 2019, for corresponding International Application No. PCT/JP2019/012434, 4 pages.

Nokia, "Draft CR to 38.214 capturing the Jan. 18 ad-hoc and RAN1#92 meeting agreements" R1-1803555, 3GPP TSG-RAN1 Meeting #92, Athens, Feb. 26-Mar. 1, 2018. (78 pages).

Panasonic, "Discussion on UCI multiplexing," R1-1806181, Agenda Item: 7.1.3.2.3, 3GPP TSG RAN WG1 Meeting #93, Busan, Korea, May 21-25, 2018, 3 pages.

Panasonic, "Remaining issues on physical uplink control channel," R1-1808620, Agenda Item: 7.1.3.2, 3GPP TSG RAN WG1 Meeting #94, Gothenburg, Sweden, Aug. 20-24, 2018, 6 pages.

Qualcomm Incorporated, " Summary of remaining issues for overlapping UL transmissions," R1-1807820, Agenda Item: 7.1.3.2.3, 3GPP TSG RAN WG1 Meeting #93, Busan, Korea, May 21-25, 2018, 17 pages.

Samsung, "Corrections on UCI Multiplexing in PUSCH," R1-1806735, Agenda Item: 7.1.3.2.3, 3GPP TSG RAN WG1 #93, Busan, Korea, May 21-25, 2018, 4 pages.

Samsung, "CR to TS 38.213 capturing the RAN1#92bis and RAN1#93 meeting agreements and aligning higher layer parameters with TS 38.331," R1-1807957, 3GPP TSG-RAN1 Meeting #93, Busan, Korea, May 21-25, 2018. (92 pages).

* cited by examiner

TERMINAL, BASE STATION, AND COMMUNICATION METHOD

TECHNICAL FIELD

The present disclosure relates to a terminal, a base station, and a communication method.

BACKGROUND ART

New Radio access technology (NR) has been developed for implementing the 5th Generation mobile communication systems (5G) in the 3rd Generation Partnership Project (3GPP). Functions to support Ultra Reliable and Low Latency Communication (URLLC) as well as high-speed and large capacity communication, which are basic requirements for enhanced Mobile Broadband (eMBB), are main targets under study in NR (e.g., see Non-Patent Literatures (hereinafter, referred to as “NPL”) 1 to 4).

In NR, a terminal (e.g., referred to as User Equipment (UE)) transmits Uplink Control Information (UCI) to a base station (e.g., eNB: referred to as eNodeB or gNB). The UCI includes, for example, a response signal indicating an error detection result for downlink data (Acknowledgement/Negative Acknowledgement (ACK/NACK)), Channel State Information (CSI) for downlink, or a radio resource allocation request (Scheduling Request (SR)) for uplink.

CITATION LIST

Non-Patent Literature

NPL 1

3GPP TS 38.211 V15.2.0, “NR; Physical channels and modulation (Release 15),” June 2018.

NPL 2

3GPP TS 38.212 V15.2.0, “NR; Multiplexing and channel coding (Release 15),” June 2018.

NPL 3

3GPP TS 38.213 V15.2.0, “NR; Physical layer procedures for control (Release 15),” June 2018.

NPL 4

3GPP TS 38.214 V15.2.0, “NR; Physical layer procedures for data (Release 15),” June 2018.

SUMMARY OF INVENTION

However, transmission methods for the uplink control information in NR have not been fully studied.

One non-limiting and exemplary embodiment facilitates providing a terminal, a base station, and a communication method each capable of appropriately transmitting uplink control information.

A terminal according to an embodiment of the present disclosure includes: a receiver, which in operation, receives first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and a transmitter, which in operation, transmits the uplink control information using a resource for the uplink data channel, when the first indication information indicates the absence of the transmission of the uplink data and the second indication information indicates the absence of the transmission of the channel state information.

A base station according to an embodiment of the present disclosure includes: a transmitter, which in operation, transmits first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and a receiver, which in operation, receives the uplink control information to be transmitted using a resource for the uplink data channel, when the first indication information indicates the absence of the transmission of the uplink data and the second indication information indicates the absence of the transmission of the channel state information.

A communication method according to an embodiment of the present disclosure includes: receiving first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and transmitting the uplink control information using a resource for the uplink data channel, when the first indication information indicates the absence of the transmission of the uplink data and the second indication information indicates the absence of the transmission of the channel state information.

A communication method according to an embodiment of the present disclosure includes: transmitting first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and receiving the uplink control information to be transmitted using a resource for the uplink data channel, when the first indication information indicates the absence of the transmission of the uplink data and the second indication information indicates the absence of the transmission of the channel state information.

It should be noted that general or specific embodiments may be implemented as a system, an apparatus, a method, an integrated circuit, a computer program, a storage medium, or any selective combination thereof.

According to an embodiment of the present disclosure, it is possible to appropriately transmit uplink control information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, detailed descriptions will be given of embodiments of the present disclosure with reference to the accompanying drawings.

Figure 1:
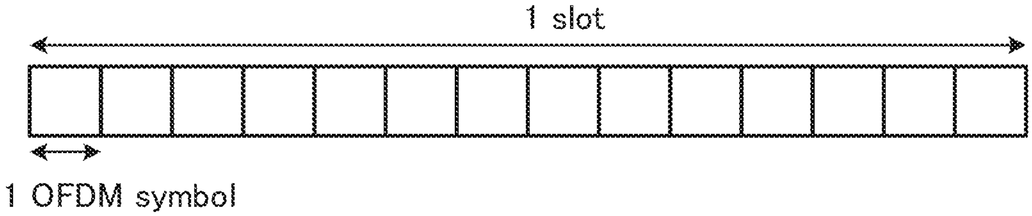
FIG. 1 illustrates an exemplary slot configuration in NR.

In NR, a base station performs communication by allocating a radio resource for a terminal in a time unit called a slot or a mini-slot. FIG. 1 illustrates an exemplary slot configuration in NR. A single slot includes a plurality of Orthogonal Frequency Division Multiplexing (OFDM) symbols. For example, a single slot includes 14 OFDM symbols in NR. In addition, the base station allocates a radio resource for the terminal in a time unit shorter than a slot (e.g., 1, 2, 4, or 7 symbols) in a resource allocation of mini-slot units.

The base station also allocates a radio resource in frequency domain for the terminal in NR. The minimum resource unit in the frequency domain is a Resource Element (RE), and the RE includes a single sub-carrier. The base station allocates the radio resource in the frequency domain for the terminal using a frequency unit called a Resource Block (RB). A single RB includes 12 sub-carriers in NR, for example.

When the terminal transmits UCI in a slot (or a mini-slot) where a radio resource for an uplink data channel (e.g., Physical Uplink Shared Channel (PUSCH)), which is hereinafter referred to as a "PUSCH resource", is not allocated, the terminal transmits the UCI to the base station using an uplink control channel (e.g., Physical Uplink Control Channel (PUCCH)).

Note that the UCI to be transmitted using PUCCH includes ACK/NACK indicating an error detection result for downlink data, Periodic CSI (P-CSI), Semi-Persistent CSI (SP-CSI), or SR, for example.

Further, in NR, the base station allocates the PUSCH resource for the terminal using Downlink Control Information (DCI). The DCI for allocating the PUSCH resource (a DCI format used for scheduling PUSCH) includes, for example, DCI format 0-1 (see NPL 2, for example).

The DCI format 0-1 includes a UL-SCH indicator field. When UL-SCH indicator=1 is indicated, for example, uplink data (Uplink Shared Channel (UL-SCH)) is transmitted using PUSCH. When UL-SCH indicator=0 is indicated, in contrast, UL-SCH is not transmitted on PUSCH. That is, the UL-SCH indicator is indication information indicating the presence or absence of the UL-SCH transmission on PUSCH.

Additionally, the DCI format 0-1 includes a CSI request field. The CSI request field is used for requesting CSI transmission using PUSCH from the base station to the terminal. Note that the CSI to be transmitted using PUSCH by the request from the CSI request field includes SP-CSI, or Aperiodic CSI (A-CSI). When non-zero is indicated in the CSI request field, for example, CSI is transmitted using PUSCH. When zero is indicated in the CSI request field, in contrast, the base station does not request a CSI report in the corresponding PUSCH to the terminal. That is, the CSI request is indication information indicating the presence or absence of the CSI transmission on PUSCH.

The CSI report on PUSCH can be transmitted by being multiplexed with UL-SCH on PUSCH. At this time, UL-SCH indicator=1 and CSI request=non-zero are indicated to the terminal by DCI.

The CSI report on PUSCH can be transmitted without the UL-SCH transmission on PUSCH. At this time, UL-SCH indicator=0 and CSI request=non-zero are indicated to the terminal by DCI.

Further, the terminal can transmit UL-SCH on PUSCH when the base station does not request the CSI report. At this time, UL-SCH indicator=1 and CSI request=0 are indicated to the terminal by DCI.

As described above, the terminal transmits UCI and UL-SCH to the base station based on the relationship between the respective configurations of the UL-SCH indicator field and the CSI request field by DCI. The above-described relationships between the UL-SCH indicator field and the CSI request field is not complete, however.

Operations of the terminal are unclear when UL-SCH indicator=0 and CSI request=0 are indicated in DCI, that is, when the UL-SCH transmission on PUSCH does not occur and the base station does not request the CSI report, for example.

This may cause the following problem as an example.

Figure 2:
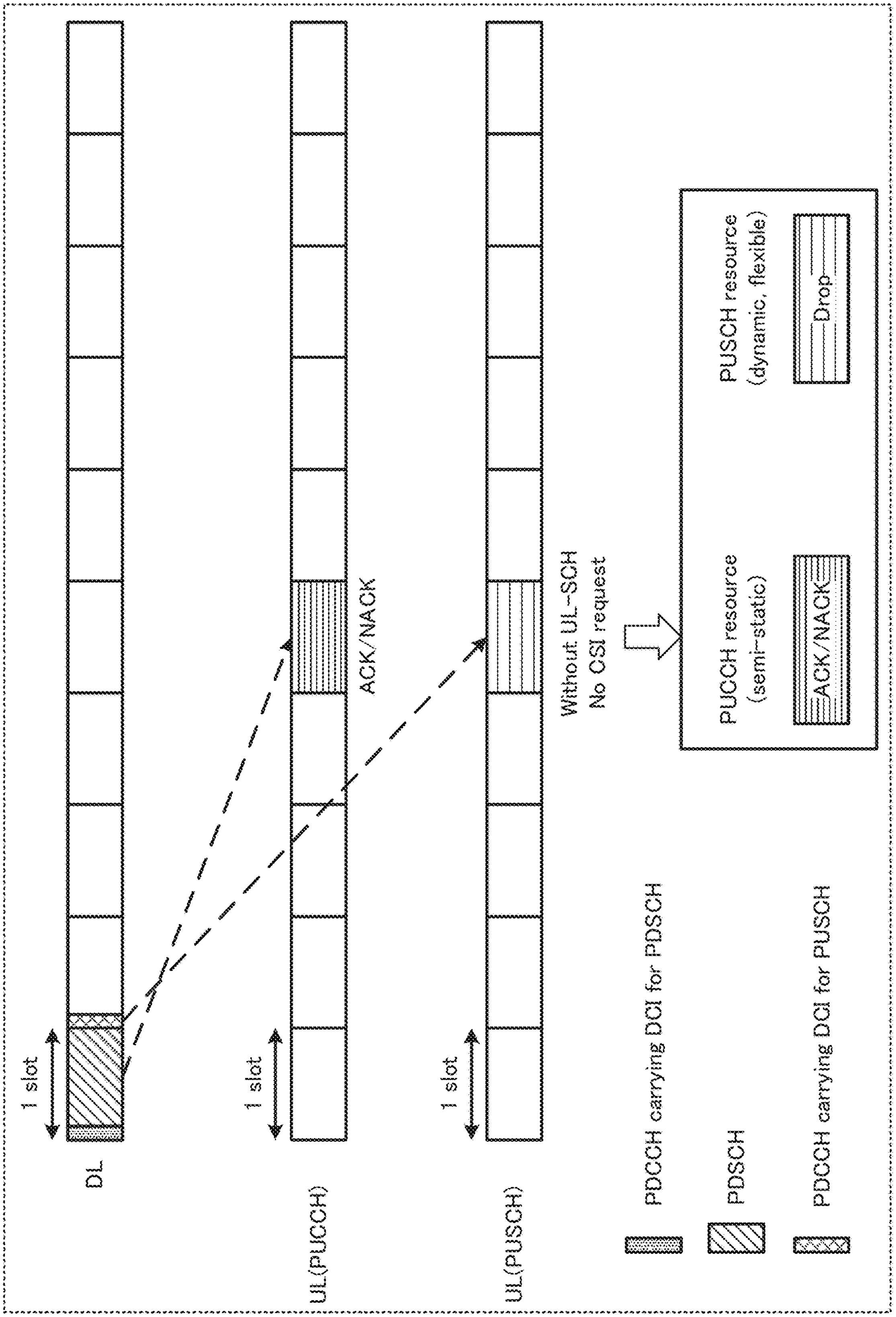
FIG. 2 illustrates an exemplary UCI transmission on PUSCH.

The terminal indicated UL-SCH indicator=0 and CSI request=0 cannot transmit UCI on PUSCH, for example. FIG. 2 illustrates a case where a PUSCH resource indicated UL-SCH indicator=0 and CSI request=0 is allocated to the same time resource as (or a time resource partly overlapped with) a slot (or a mini-slot) to which PUCCH for transmitting UCI such as ACK/NACK to downlink data (e.g., PDSCH) is allocated, for example. In the case of FIG. 2, the terminal conceivably transmits the UCI (e.g., ACK/NACK) not on PUSCH but on PUCCH.

The allocation of a radio resource for PUCCH (hereinafter referred to as a "PUCCH resource"), however, is operated semi-statically. The semi-static allocation of the PUCCH resource cannot follow a dynamic change of a channel state or a requirement, and thus the radio resource may not be used effectively. For example, when the channel state of the semi-statically allocated PUCCH resource is deteriorated by the influence of channel fluctuation or inter-cell interference, the UCI transmission on PUCCH by the terminal may cause the received quality of the UCI to be deteriorated. The deterioration of the received quality of the UCI possibly causes influence on system optimization and causes deterioration of system throughput.

Thus, an embodiment of the present disclosure will describe methods of appropriately transmitting UCI from a terminal to a base station in NR.

Hereinafter, each embodiment will be described in detail.

Embodiment 1

[Overview of Communication System]

The communication system according to each embodiment of the present disclosure includes base station 100 and terminal 200.

Figure 3:
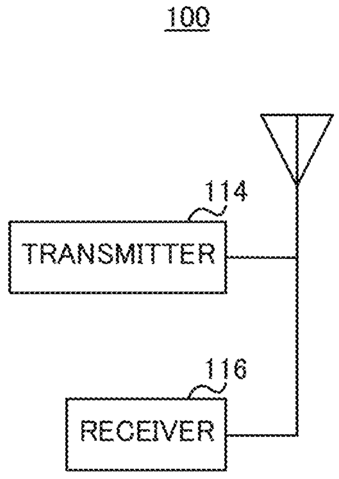
FIG. 3 is a block diagram illustrating a configuration of a part of a base station according to Embodiment 1.

FIG. 3 is a block diagram illustrating a configuration of a part of base station 100 according to each embodiment of the present disclosure. In base station 100 illustrated in FIG. 3, transmitter 114 transmits the first control information (e.g., DCI) on an uplink data channel (e.g., PUSCH) and the second control information on an uplink control channel (e.g., PUCCH) for transmitting uplink control information (e.g., UCI). The first control information includes the first indication information (e.g., a UL-SCH indicator) indicating the presence or absence of transmission of uplink data (e.g., UL-SCH) and the second indication information (e.g., a CSI request) indicating the presence or absence of transmission of channel state information (CSI). Receiver 116 receives the uplink control information to be transmitted using a resource for the uplink data channel when the first indication information indicates the absence of the transmission of the uplink data and the second indication information indicates the absence of the transmission of the channel state information.

Figure 4:
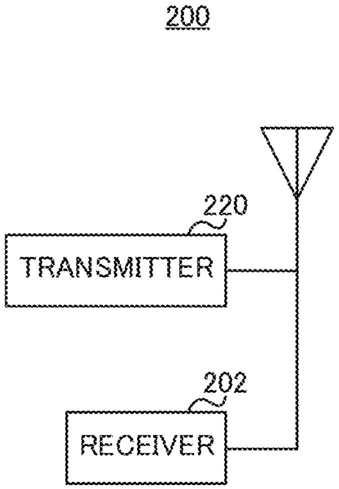
FIG. 4 is a block diagram illustrating a configuration of a part of a terminal according to Embodiment 1.

FIG. 4 is a block diagram illustrating a configuration of a part of terminal 200 according to each embodiment of the present disclosure. In terminal 200 illustrated in FIG. 4, receiver 202 receives the first control information (e.g., DCI) on an uplink data channel (e.g., PUSCH) and the second control information on an uplink control channel (e.g., PUCCH) for transmitting uplink control information (e.g., UCI). The first control information includes the first indication information (e.g., a UL-SCH indicator) indicating the presence or absence of transmission of uplink data and the second indication information (e.g., a CSI request) indicating the presence or absence of transmission of channel state information. Transmitter 220 transmits the uplink control information using a resource for the uplink data channel when the first indication information indicates the absence of the transmission of the uplink data and the second indication information indicates the absence of the transmission of the channel state information.

[Configuration of Base Station]

Figure 5:
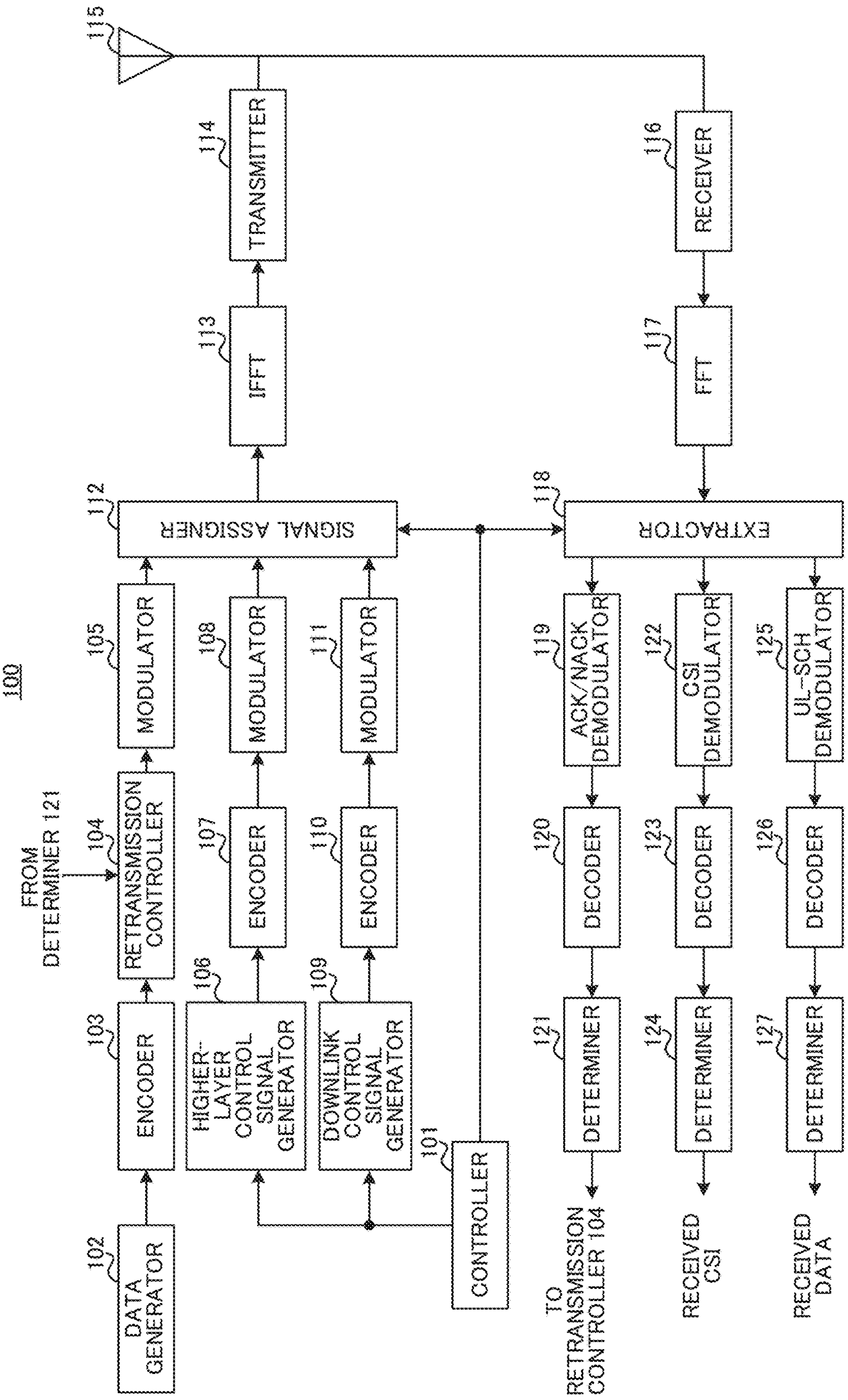
FIG. 5 is a block diagram illustrating a configuration of the base station according to Embodiment 1.

FIG. 5 is a block diagram illustrating a configuration of base station 100 according to Embodiment 1 of the present disclosure. In FIG. 5, base station 100 includes controller 101, data generator 102, encoder 103, retransmission controller 104, modulator 105, higher-layer control signal generator 106, encoder 107, modulator 108, downlink control signal generator 109, encoder 110, modulator 111, signal assigner 112, Inverse Fast Fourier Transformer (hereinafter, referred to as "IFFT") 113, transmitter 114, antenna 115, receiver 116, Fast Fourier Transformer (hereinafter, referred to as "FFT") 117, extractor 118, ACK/NACK demodulator 119, decoder 120, determiner 121, CSI demodulator 122, decoder 123, determiner 124, UL-SCH demodulator 125, decoder 126, and determiner 127.

Controller 101 determines information on uplink transmission of terminal 200, and outputs the determined information to extractor 118.

The information on uplink transmission of terminal 200 includes, for example, information on a PUSCH resource or information on UCI transmission. The information on the PUSCH resource includes the presence or absence of UL-SCH (e.g., the UL-SCH indicator), the presence or absence of A/SP-CSI request (e.g., the CSI request), a Modulation and Coding scheme (MCS) for the information to be transmitted on PUSCH (e.g., UL-SCH or UCI), and radio resource allocation for PUSCH, for example. The information on UCI transmission includes MCS for the information to be transmitted on PUCCH (UCI), and information on the PUCCH resource.

In addition, controller 101 determines a resource for transmitting UCI in terminal 200, and outputs the determined information to extractor 118. For example, controller 101 determines the resource for transmitting UCI in terminal 200 based on the information on the PUCCH resource, the information on the PUSCH resource (e.g., information of the UL-SCH indicator and the CSI request), or the positional relationship between the PUCCH resource and the PUSCH resource in time domain. Note that determination methods for the resource for transmitting UCI in terminal 200 will be described later in detail. Controller 101 also outputs the information on the uplink transmission of terminal 200 to higher-layer control signal generator 106 or downlink control signal generator 109.

The information to be outputted to higher-layer control signal generator 106 includes information on PUCCH transmission to be semi-statically allocated or the information on the PUCCH resource, for example.

Meanwhile, the information to be outputted to downlink control signal generator 109 includes the presence or absence of UL-SCH (e.g., the UL-SCH indicator) to be indicated by DCI (e.g., DCI format 0-1) for allocating the PUSCH resource, the presence or absence of A/SP-CSI request (e.g., the CSI request), MCS for the information to be transmitted on PUSCH, and resource allocation, for example. The information to be outputted to downlink control signal generator 109 also includes information on the PUCCH resource to transmit ACK/NACK to be indicated by DCI (e.g., DCI format 1-0 or DCI format 1-1) for allocating a radio resource for PDSCH (hereinafter referred to as a "PDSCH resource").

In addition, controller 101 determines the radio resource allocation for a higher-layer control signal or a downlink control signal for transmitting downlink control information, and the radio resource allocation for a downlink data signal. Controller 101 outputs the determined information to signal assigner 112.

Data generator 102 generates downlink data for terminal 200, and outputs the data to encoder 103.

Encoder 103 applies error correction encoding to the downlink data to be inputted from data generator 102, and outputs the data signal after encoding to retransmission controller 104.

Retransmission controller 104 holds the encoded data signal to be inputted from encoder 103 at the first transmission, and also outputs the signal to modulator 105. Further, when NACK to the transmitted data signal is inputted from determiner 121, which will be described later, retransmission controller 104 outputs the corresponding holding data to modulator 105. When ACK to the transmitted data signal is inputted from determiner 121, in contrast, retransmission controller 104 deletes the corresponding holding data.

Modulator 105 modulates the data signal to be inputted from retransmission controller 104, and outputs the data modulated signal to signal assigner 112.

Higher-layer control signal generator 106 generates a control information bit string (a higher-layer control signal) using the control information to be inputted from controller 101, and outputs the generated control information bit string to encoder 107.

Encoder 107 applies error correction encoding to the control information bit string to be inputted from higher-layer control signal generator 106 and outputs the control signal after encoding to modulator 108.

Modulator 108 modulates the control signal to be inputted from encoder 107, and outputs the control signal after the modulation to signal assigner 112.

Downlink control signal generator 109 generates a control information bit string (a downlink control signal; e.g., DCI) using the control information to be inputted from controller 101, and outputs the generated control information bit string to encoder 110. The control information is transmitted to a plurality of terminals in some cases, and thus downlink control signal generator 109 may generate the bit string including a terminal ID of each terminal in the control information for each terminal.

Encoder 110 applies error correction encoding to the control information bit string to be inputted from downlink control signal generator 109, and outputs the control signal after encoding to modulator 111.

Modulator 111 modulates the control signal to be inputted from encoder 110, and outputs the control signal after the modulation to signal assigner 112.

Signal assigner 112 maps the data signal to be inputted from modulator 105, the higher-layer control signal to be inputted from modulator 108, or the downlink control signal to be inputted from modulator 111 to a radio resource based on the information indicating the radio resource to be inputted from controller 101. Signal assigner 112 outputs the downlink signal including the mapped signal to IFFT 113.

IFFT 113 applies transmission waveform generation processing such as OFDM to the signal to be inputted from signal assigner 112. IFFT 113 adds a Cyclic Prefix (CP) in the case of OFDM transmission adding a CP (not illustrated). IFFT 113 outputs the generated transmission waveform to transmitter 114.

Transmitter 114 applies Radio Frequency (RF) processing such as Digital-to-Analog (D/A) conversion and up-conversion to the signal to be inputted from IFFT 113, and transmits the radio signal to terminal 200 via antenna 115.

Receiver 116 applies RF processing such as down-conversion or Analog-to-Digital (A/D) conversion to an uplink signal waveform received from terminal 200 via antenna 115, and outputs the uplink signal waveform after the reception processing to FFT 117.

FFT 117 applies FFT processing for converting a time-domain signal into a frequency-domain signal to the uplink signal waveform to be inputted from receiver 116. FFT 117 outputs the frequency-domain signal obtained by the FFT processing to extractor 118.

Extractor 118 extracts a radio resource component on which ACK/NACK has been transmitted, a radio resource component on which CSI has been transmitted, or a radio resource component on which UL-SCH has been transmitted, from the signal to be inputted from FFT 117 based on the information to be inputted from controller 101 (e.g., the information on the uplink transmission). Extractor 118 outputs the extracted radio resource component of ACK/NACK to ACK/NACK demodulator 119, outputs the extracted radio resource component of CSI to CSI demodulator 122, and outputs the extracted radio resource component of UL-SCH to UL-SCH demodulator 125.

ACK/NACK demodulator 119 equalizes and demodulates the radio resource component corresponding to ACK/NACK to be inputted from extractor 118, and outputs the demodulation result to decoder 120.

Decoder 120 performs error correction decoding on the signal corresponding to ACK/NACK using the demodulation result to be inputted from ACK/NACK demodulator 119, and outputs the bit sequence after decoding to determiner 121.

Determiner 121 determines whether the ACK/NACK transmitted from terminal 200 indicates ACK or NACK to the transmitted data signal based on the bit sequence to be inputted from decoder 120. Determiner 121 outputs the determination result to retransmission controller 104.

CSI demodulator 122 equalizes and demodulates the radio resource component corresponding to CSI to be inputted from extractor 118, and outputs the demodulation result to decoder 123.

Decoder 123 performs error correction decoding on the signal corresponding to CSI using the demodulation result to be inputted from CSI demodulator 122, and outputs the bit sequence after decoding to determiner 124.

Determiner 124 applies error detection to the bit sequence to be inputted from decoder 123, and obtains received CSI when no error is detected.

UL-SCH demodulator 125 equalizes and demodulates the radio resource component corresponding to UL-SCH to be inputted from extractor 118, and outputs the demodulation result to decoder 126.

Decoder 126 performs error correction decoding on the signal corresponding to UL-SCH using the demodulation result to be inputted from UL-SCH demodulator 125, and outputs the bit sequence after decoding to determiner 127.

Determiner 127 applies error detection to the bit sequence to be inputted from decoder 126, and obtains received data (i.e., received UL-SCH) when no error is detected. Note that determiner 127 may generate ACK/NACK for a retransmission request to terminal 200 using the error detection result, and output the signal to retransmission controller 104 (not illustrated).

[Configuration of Terminal]

Figure 6:
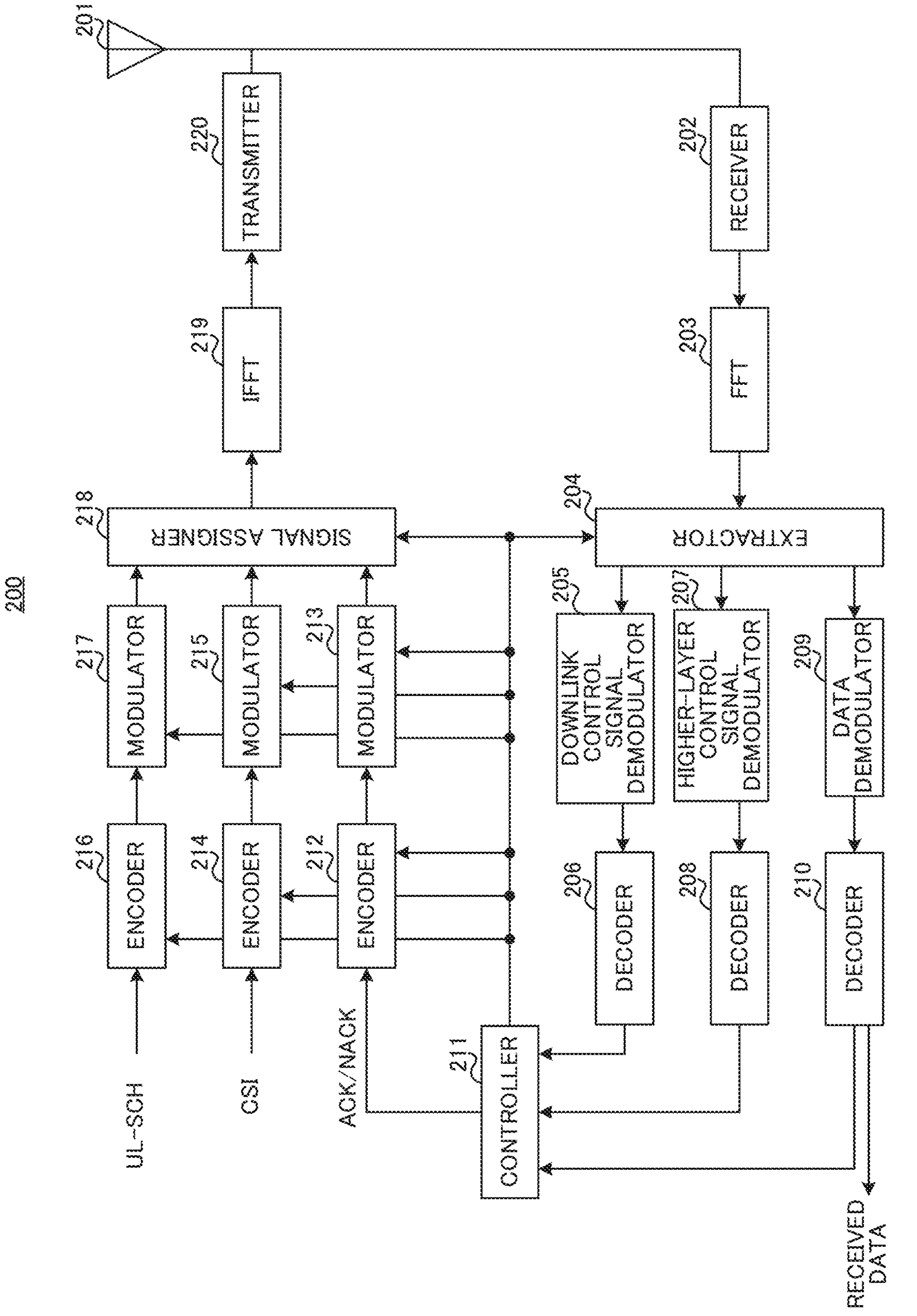
FIG. 6 is a block diagram illustrating a configuration of the terminal according to Embodiment 1.

FIG. 6 is a block diagram illustrating a configuration of terminal 200 according to Embodiment 1 of the present disclosure. In FIG. 6, terminal 200 includes antenna 201, receiver 202, FFT 203, extractor 204, downlink control signal demodulator 205, decoder 206, higher-layer control signal demodulator 207, decoder 208, data demodulator 209, decoder 210, controller 211, encoders 212, 214, and 216, modulators 213, 215, and 217, signal assigner 218, IFFT 219, and transmitter 220.

Receiver 202 applies RF processing such as down-conversion or Analog-to-Digital (A/D) conversion to a signal waveform of a downlink signal (a data signal or a control signal) received from base station 100 via antenna 201, and outputs the received signal (i.e., a baseband signal) obtained by the RF processing to FFT 203.

FFT 203 applies FFT processing for converting a time-domain signal into a frequency-domain signal to the signal (the time-domain signal) to be inputted from receiver 202. FFT 203 outputs the frequency-domain signal obtained by the FFT processing to extractor 204.

Extractor 204 extracts a downlink control signal (e.g., DCI) from the signal to be inputted from FFT 203 based on the control information to be inputted from controller 211, and outputs the signal to downlink control signal demodulator 205. Extractor 204 also extracts a higher-layer control signal and a downlink data signal based on the control information to be inputted from controller 211. Extractor 204 outputs the higher-layer control signal to higher-layer control signal demodulator 207, and the downlink data signal to data demodulator 209.

Downlink control signal demodulator 205 blind-decodes the downlink control signal to be inputted from extractor 204. When the signal is determined to be a control signal for terminal 200, downlink control signal demodulator 205 demodulates the control signal and outputs the demodulation result to decoder 206.

Decoder 206 applies error correction decoding using the demodulation result to be inputted from downlink control signal demodulator 205, and obtains control information. Decoder 206 then outputs the obtained control information to controller 211.

Higher-layer control signal demodulator 207 equalizes and demodulates the higher-layer control signal to be inputted from extractor 204, and outputs the demodulation result to decoder 208.

Decoder 208 applies error correction decoding using the demodulation result to be inputted from higher-layer control signal demodulator 207, and obtains control information. Decoder 208 then outputs the obtained control information to controller 211.

Data demodulator 209 equalizes and demodulates the downlink data signal to be inputted from extractor 204, and outputs the demodulation result to decoder 210.

Decoder 210 applies error correction decoding using the demodulation result to be inputted from data demodulator 209. Decoder 210 also applies error detection to the downlink data signal, and outputs the error detection result to controller 211. In addition, decoder 210 outputs the downlink data determined to have no errors as a result of the error detection, as received data.

Controller 211 calculates, for example, MCS to be used for the uplink transmission or radio resource allocation based on the information on the uplink transmission of terminal 200 included in the control information to be inputted from decoder 206 or decoder 208. Controller 211 outputs the calculated information to encoders 212, 214, and 216, modulators 213, 215, and 217, and signal assigner 218 respectively. Controller 211 also generates ACK/NACK using the error detection result to be inputted from decoder 210, and outputs the ACK/NACK to encoder 212.

Further, controller 211 determines a resource for terminal 200 to transmit UCI (e.g., ACK/NACK or CSI) based on the information on the PUCCH resource, the information on the PUSCH resource (e.g., the information of the UL-SCH indicator and the CSI request), or the positional relationship between the PUCCH resource and the PUSCH resource in time domain. Controller 211 outputs information indicating the determined resource to signal assigner 218.

Furthermore, controller 211 outputs the information on the radio resource for the downlink data signal or the control signal included in the control information to be inputted from decoder 206 or decoder 208, to extractor 204.

Encoder 212 applies error correction encoding to the ACK/NACK (a bit sequence) to be inputted from controller 211, and outputs the ACK/NACK (the bit sequence) after encoding to modulator 213.

Modulator 213 modulates the ACK/NACK to be inputted from encoder 212, and outputs the ACK/NACK after the modulation (a modulation symbol sequence) to signal assigner 218.

Encoder 214 applies error correction encoding to a bit sequence corresponding to CSI to be inputted, and outputs the CSI (the bit sequence) after encoding to modulator 215.

Modulator 215 modulates the CSI to be inputted from encoder 214, and outputs the CSI after the modulation (a modulation symbol sequence) to signal assigner 218.

Encoder 216 applies error correction encoding to the uplink data (UL-SCH) to be inputted, and outputs the uplink data (the bit sequence) after encoding to modulator 217.

Modulator 217 modulates the uplink data to be inputted from encoder 216, and outputs the uplink data after the modulation (a modulation symbol sequence) to signal assigner 218.

Note that encoders 212, 214, and 216, and modulators 213, 215, and 217 respectively perform the encoding process and the demodulation process based on the control information inputted from controller 211 (e.g., a coding rate or a modulation scheme).

Signal assigner 218 respectively maps the ACK/NACK to be inputted from modulator 213, the CSI to be inputted from modulator 215, or the uplink data to be inputted from modulator 217 to the radio resource to be indicated by controller 211. Signal assigner 218 outputs the uplink signal including the mapped signal to IFFT 219.

IFFT 219 applies transmission waveform generation processing such as OFDM to the signal to be inputted from signal assigner 218. IFFT 219 adds a Cyclic Prefix (CP) in the case of OFDM transmission adding a CP (not illustrated). Alternatively, a Discrete Fourier Transformer (DFT) may be added in a preceding stage of signal assigner 218 when IFFT 219 generates a single-carrier waveform (not illustrated). IFFT 219 outputs the generated transmission waveform to transmitter 220.

Transmitter 220 applies Radio Frequency (RF) processing such as Digital-to-Analog (D/A) conversion and up-conversion to the signal to be inputted from IFFT 219, and transmits the radio signal to base station 100 via antenna 201.

[Operations of Base Station 100 and Terminal 200]

Operations of base station 100 and terminal 200 that include above-mentioned configurations will be described in detail.

Figure 7:
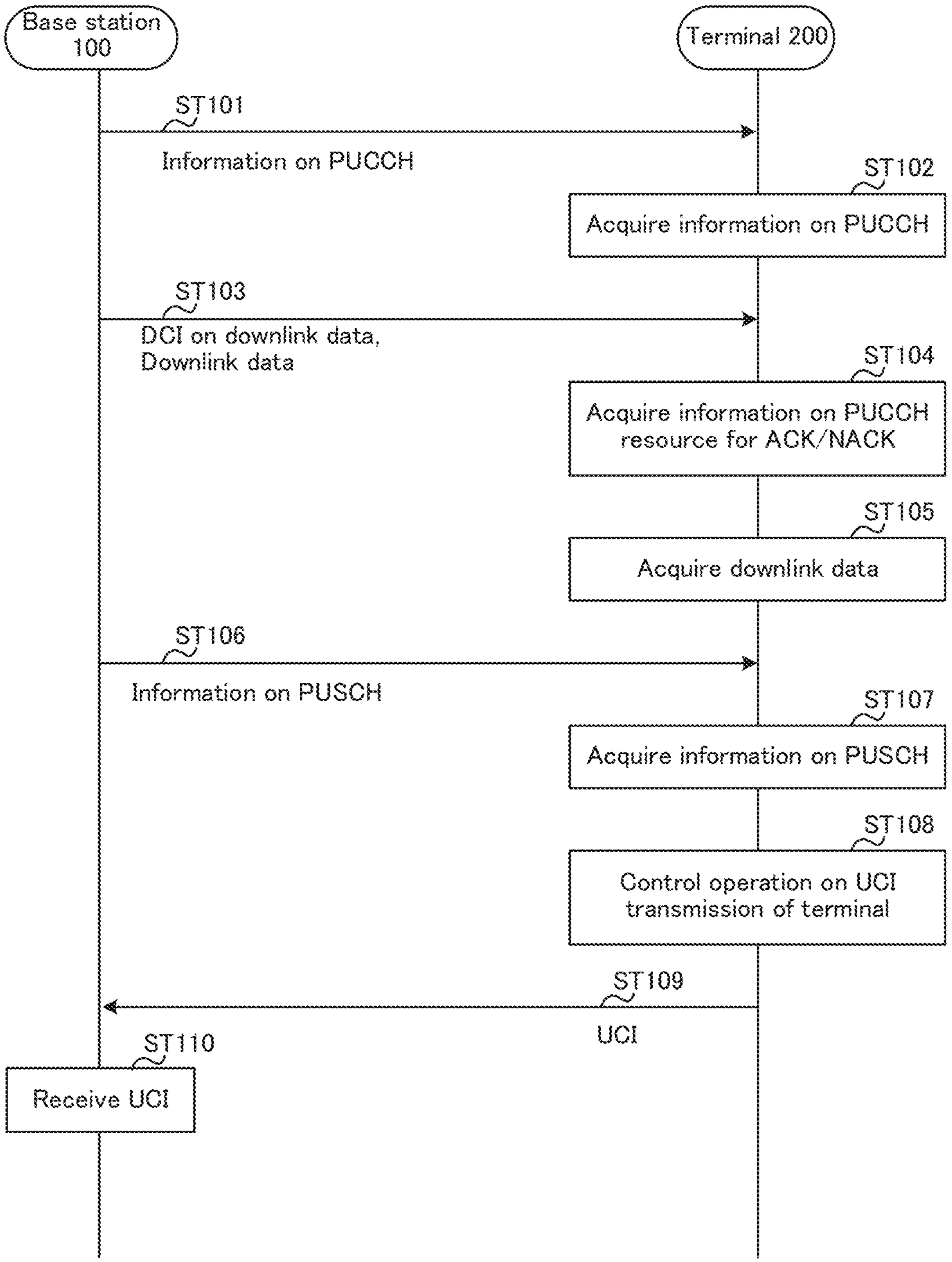
FIG. 7 is a sequence diagram illustrating processing in the base station and the terminal according to Embodiment 1.

FIG. 7 illustrates the processing in base station 100 and terminal 200 according to the present embodiment.

Base station 100 transmits information on PUCCH to be configured semi-statically (e.g., information on PUCCH transmission or information on a PUCCH resource) to terminal 200 (ST101). Terminal 200 acquires the information on PUCCH indicated from base station 100 (ST102).

Base station 100 transmits DCI including information on downlink data and downlink data corresponding to the DCI to terminal 200 (ST103). Terminal 200 acquires the information on the PUCCH resource for transmitting ACK/NACK, for example, based on the DCI to be indicated from base station 100 (ST104). Terminal 200 also acquires the downlink data (PDSCH) based on information on a PDSCH resource included in the DCI (ST105).

Base station 100 transmits control information (e.g., DCI) including information on PUSCH (e.g., a UL-SCH indicator, a CSI request, or resource allocation information) to terminal 200 (ST106). Terminal 200 acquires the information on PUSCH to be indicated from base station 100 (ST107).

Terminal 200 controls the operation related to UCI transmission (ST108). For example, terminal 200 determines a resource (e.g., a PUCCH resource or a PUSCH resource) for transmitting the UCI based on the information on PUSCH included in the DCI (e.g., the UL-SCH indicator, the CSI request, or the PUSCH resource), and the information on PUCCH to be configured semi-statically (e.g., the PUCCH resource). When UL-SCH indicator=0 and CSI request=0 are indicated by the DCI allocating PUSCH, for example, terminal 200 determines the resource to be used for the UCI transmission to be the PUSCH resource allocated by the DCI.

Terminal 200 transmits the UCI to base station 100 using the determined resource (the PUCCH resource or the PUSCH resource) (ST109). Base station 100 receives the UCI to be transmitted from terminal 200 using the determined resource (ST110).

Note that, in FIG. 7, the order of the processes from ST103 to ST105 and the processes in ST106 and ST107 may be replaced with each other.

Next, control methods of the operation related to the UCI transmission (e.g., a process in ST108 in FIG. 7) in terminal 200 will be described in detail.

For example, base station 100 indicates UL-SCH indicator=0 and CSI request=0 to terminal 200 using DCI allocating PUSCH.

When a PUSCH resource configured with UL-SCH indicator=0 and CSI request=0 is allocated and the PUSCH resource overlaps (or partly overlaps) in time with a PUCCH resource allocated for transmitting UCI, terminal 200 transmits the UCI scheduled to be transmitted in the PUCCH resource, using the PUSCH resource.

For example, when base station 100 allocates the PUSCH resource overlapping in time with the PUCCH resource for transmitting the UCI, base station 100 may configure UL-SCH indicator=0 and CSI request=0, and indicate DCI allocating the PUSCH resource to terminal 200.

This enables terminal 200 to transmit the UCI for which the PUCCH resource is allocated using the PUSCH resource where neither of UL-SCH nor CSI is transmitted.

Note that the UCI scheduled to be transmitted on PUCCH includes at least one of ACK/NACK to downlink data and P-CSI/SP-CSI, for example.

Hereinafter, exemplary operations of base station 100 and terminal 200 according to information included in UCI will be described in detail.

Example 1: Case where UCI Includes Only ACK/NACK to Downlink Data

When UCI includes only ACK/NACK to downlink data, base station 100 allocates a PUCCH resource for transmitting the ACK/NACK to downlink data for terminal 200.

The PUCCH resource for transmitting ACK/NACK to downlink data may be indicated semi-statically by UE-specific higher layer signaling, for example. Alternatively, a PUCCH resource set including a plurality of (e.g., eight of) PUCCH resources (candidates) may be indicated by UE-specific higher layer signaling, and a PUCCH Resource Indicator (PRI) in DCI allocating downlink data (e.g., DCI format 1-0 or DCI format 1-1) may indicate any of the PUCCH resources in the PUCCH resource set as the PUCCH resource for transmitting the ACK/NACK to the downlink data.

Further, when the number of the PUCCH resources in the PUCCH resource set is more than the number of PUCCH resources explicitly indicatable by PRI (e.g., when PRI is 3 bits and the number of the PUCCH resources in the PUCCH resource set is more than 8), the PUCCH resource may be implicitly indicated using a Control Chanel Element (CCE) in DCI allocating the downlink data. The CCE and the PUCCH resource may be associated one-to-one, for example.

Incidentally, base station 100 configures UL-SCH indicator=0 and CSI request=0 in the DCI allocating PUSCH (e.g., DCI format 0-1) and allocates the PUSCH resource for terminal 200. For example, base station 100 may allocate the PUSCH resource configured with UL-SCH indicator=0 and CSI request=0 for terminal 200 so as to overlap in time with the PUCCH resource for transmitting ACK/NACK.

When the PUCCH resource for transmitting ACK/NACK and the PUSCH resource allocated by the DCI configured with UL-SCH indicator=0 and CSI request=0 do not overlap in time with each other, terminal 200 transmits the ACK/NACK on PUCCH, for example. Terminal 200 does not transmit the ACK/NACK in the PUSCH resource allocated by the DCI.

Figure 8:
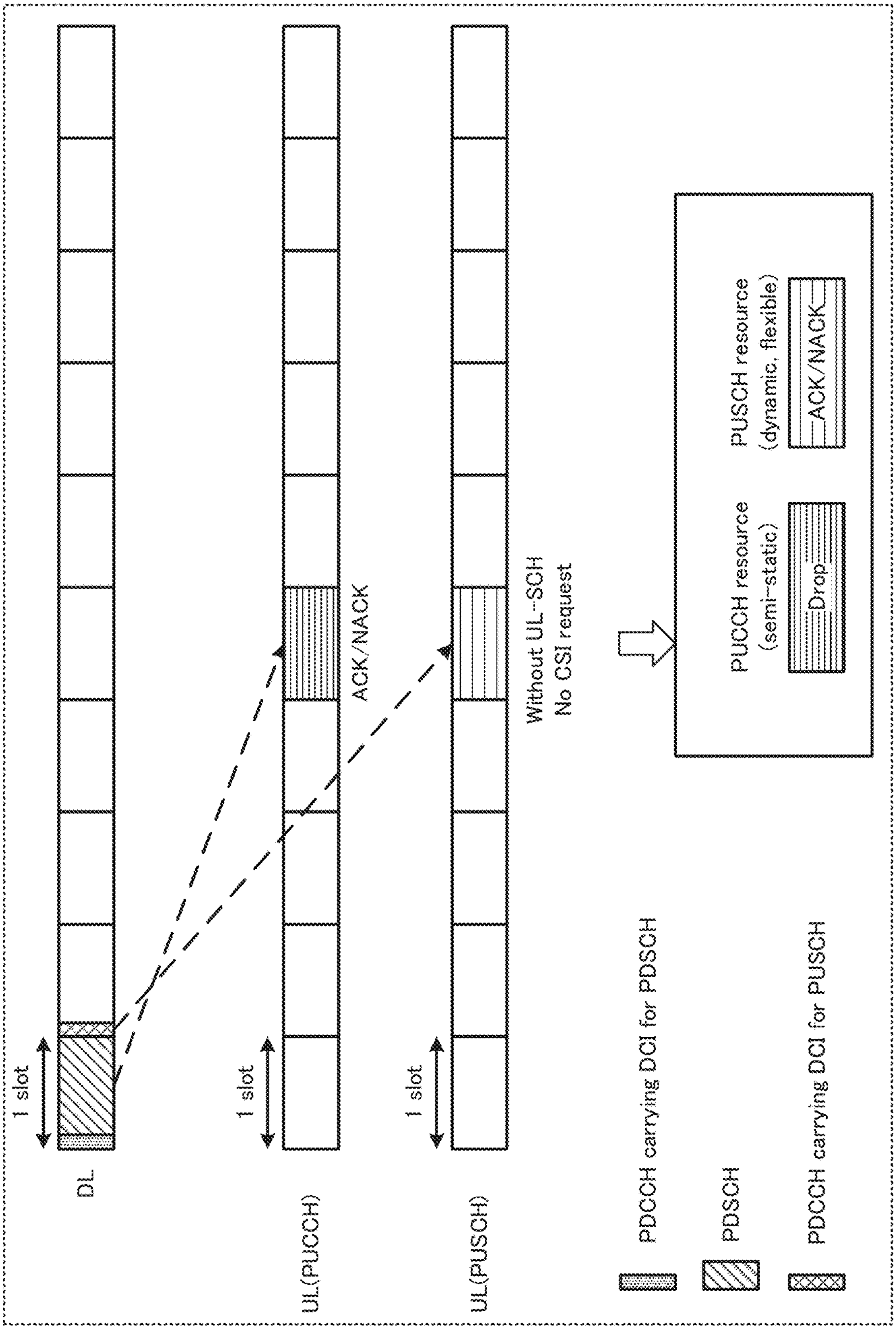
FIG. 8 illustrates an exemplary transmission of ACK/NACK according to Embodiment 1.

Meanwhile, the PUCCH resource for transmitting ACK/NACK and the PUSCH resource allocated by the DCI configured with UL-SCH indicator=0 and CSI request=0 overlap in time with each other, terminal 200 transmits the ACK/NACK using the PUSCH resource, as illustrated in FIG. 8. In other words, terminal 200 does not transmit the ACK/NACK in the PUCCH resource allocated for transmitting the ACK/NACK.

Example 2: Case where UCI Includes Only P-CSI or SP-CSI

When UCI includes only P-CSI or SP-CSI (hereinafter, collectively referred to as "P/SP-CSI"), base station 100 allocates a PUCCH resource for transmitting the P/SP-CSI for terminal 200.

The PUCCH resource for transmitting the P/SP-CSI is semi-statically indicated to terminal 200 from base station 100 by UE-specific higher layer signaling, for example.

In addition, base station 100 configures UL-SCH indicator=0 and CSI request=0 in the DCI allocating PUSCH (e.g., DCI format 0-1) and allocates the PUSCH resource for terminal 200. For example, base station 100 may allocate the PUSCH resource configured with UL-SCH indicator=0 and CSI request=0 for terminal 200 so as to overlap in time with the PUCCH resource for transmitting P/SP-CSI.

When the PUCCH resource for transmitting P/SP-CSI and the PUSCH resource allocated by the DCI configured with UL-SCH indicator=0 and CSI request=0 do not overlap in time with each other, terminal 200 transmits the P/SP-CSI on PUCCH, for example. Terminal 200 does not transmit the P/SP-CSI in the PUSCH resource.

Figure 9:
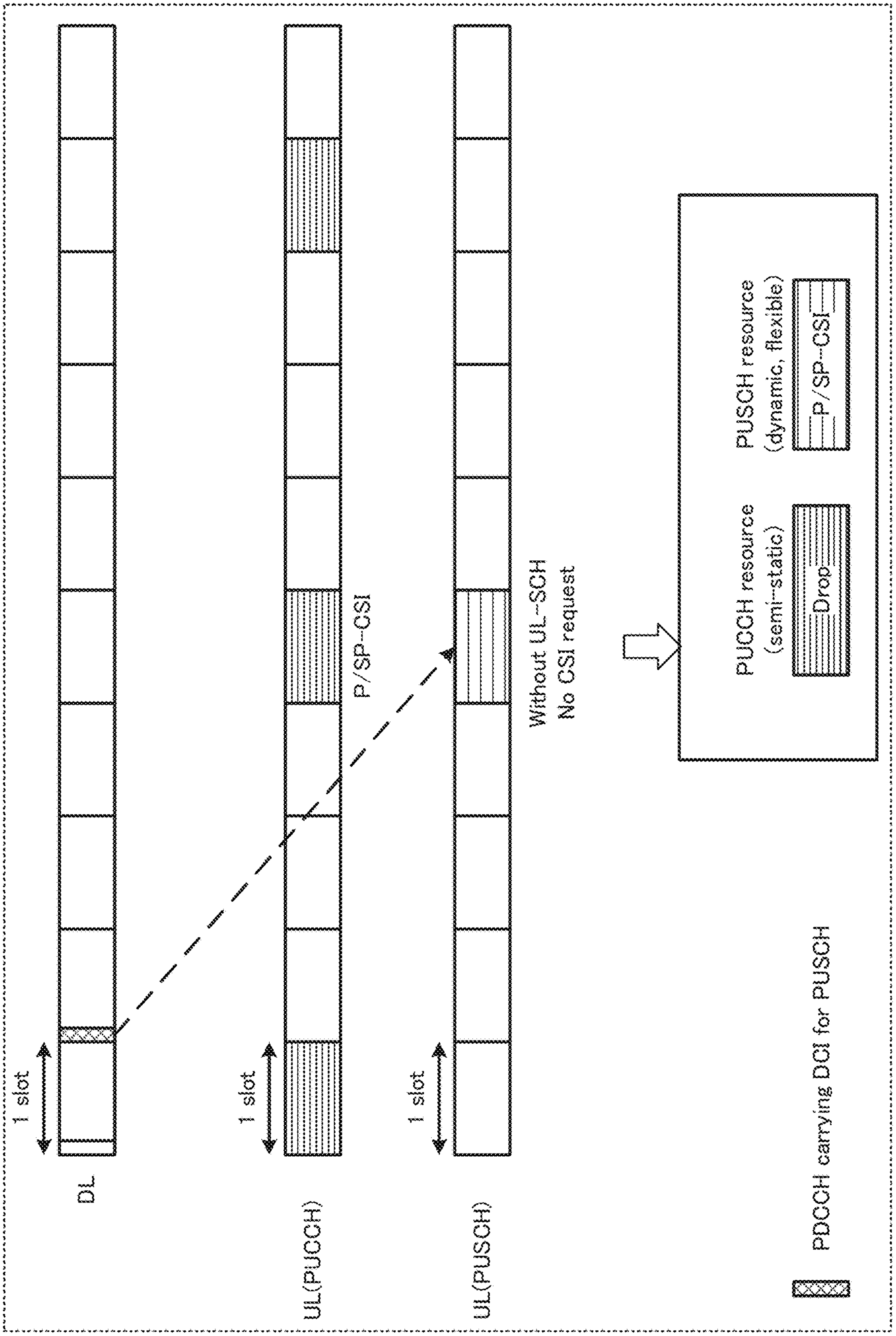
FIG. 9 illustrates an exemplary transmission of CSI according to Embodiment 1.

Meanwhile, the PUCCH resource for transmitting P/SP-CSI and the PUSCH resource allocated by the DCI configured with UL-SCH indicator=0 and CSI request=0 overlap in time with each other, terminal 200 transmits the P/SP-CSI using the PUSCH resource, as illustrated in FIG. 9. In other words, terminal 200 does not transmit the P/SP-CSI in the PUCCH resource allocated for transmitting the P/SP-CSI.

Note that the CSI transmitted by terminal 200 using the PUSCH resource may be A-CSI in Example 2.

Example 3: Case where UCI Includes ACK/NACK to Downlink Data and P/SP-CSI

When UCI includes ACK/NACK and P/SP-CSI, base station 100 allocates a PUCCH resource for transmitting the ACK/NACK to downlink data and the P/SP-CSI for terminal 200.

The PUCCH resource for transmitting ACK/NACK to downlink data and P/SP-CSI may be indicated semi-statically by UE-specific higher layer signaling, for example. Alternatively, a PUCCH resource set including a plurality of (e.g., eight of) PUCCH resources (candidates) may be indicated by UE-specific higher layer signaling, and PRI in DCI allocating downlink data (e.g., DCI format 1-0 or DCI format 1-1) may indicate any of the PUCCH resources in the PUCCH resource set as the PUCCH resource for transmitting the ACK/NACK to the downlink data and the P/SP-CSI.

In addition, base station 100 configures UL-SCH indicator=0 and CSI request=0 in the DCI allocating PUSCH (e.g., DCI format 0-1) and allocates the PUSCH resource for terminal 200. For example, base station 100 may allocate the PUSCH resource configured with UL-SCH indicator=0 and CSI request=0 for terminal 200 so as to overlap in time with the PUCCH resource for transmitting ACK/NACK and P/SP-CSI.

When the PUCCH resource for transmitting ACK/NACK and P/SP-CSI and the PUSCH resource allocated by the DCI configured with UL-SCH indicator=0 and CSI request=0 do not overlap in time with each other, terminal 200 transmits the ACK/NACK and the P/SP-CSI on PUCCH, for example. Terminal 200 does not transmit the ACK/NACK and the P/SP-CSI in the PUSCH resource allocated by the DCI configured with UL-SCH indicator=0 and CSI request=0.

Figure 10:
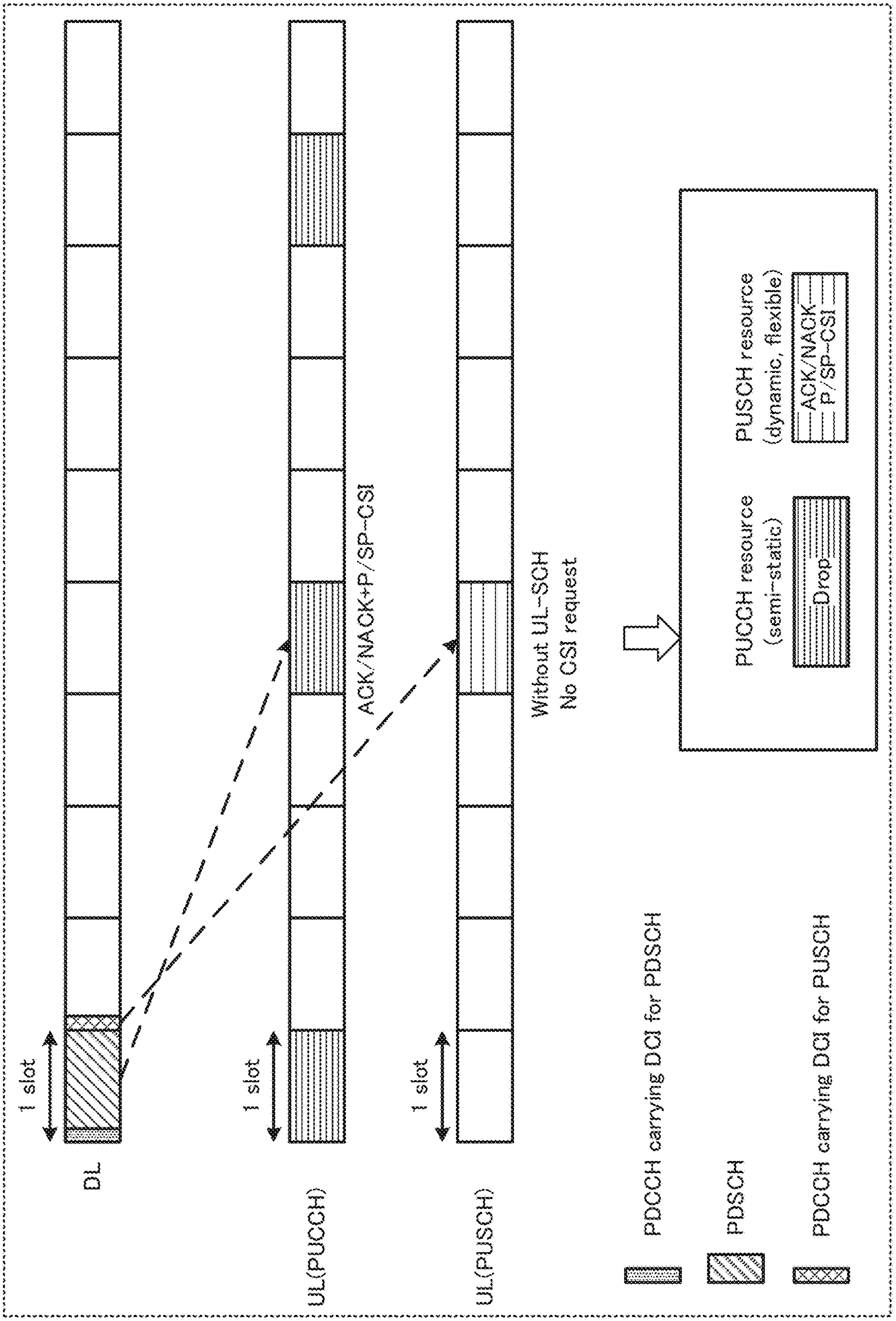
FIG. 10 illustrates an exemplary transmission of ACK/NACK and CSI according to Embodiment 1.

Meanwhile, the PUCCH resource for transmitting ACK/NACK and P/SP-CSI and the PUSCH resource allocated by the DCI configured with UL-SCH indicator=0 and CSI request=0 overlap in time with each other, terminal 200 transmits the ACK/NACK and the P/SP-CSI using the PUSCH resource, as illustrated in FIG. 10. In other words, terminal 200 does not transmit the ACK/NACK and the P/SP-CSI in the PUCCH resource allocated for transmitting the ACK/NACK and the P/SP-CSI.

The exemplary operations of base station 100 and terminal 200 according to information included in UCI have been described, thus far.

As described above, base station 100 allocates a PUSCH resource by DCI configured with UL-SCH indicator=0 and CSI request=0 for terminal 200 in the present embodiment. Further, terminal 200 transmits UCI using the PUSCH resource allocated by the DCI when a PUCCH resource allocated for transmitting the UCI and the PUSCH resource allocated by the DCI configured with UL-SCH indicator=0 and CSI request=0 overlap in time with each other.

A PUSCH resource is dynamically allocated while a PUCCH resource is semi-statically allocated as described above. Thus, base station 100 can dynamically allocate the PUSCH resource for transmitting UCI, for example, following a change of a channel state between base station 100 and terminal 200, or the like. This enables terminal 200 to transmit UCI using the PUSCH resource allocated according to the channel state even when the channel state of the PUCCH resource is deteriorated due to channel fluctuation or inter-cell interference, for example.

Therefore, terminal 200 can appropriately transmit UCI according to the present embodiment. For example, the received quality of UCI in base station 100 can be improved and the uplink resource utilization efficiency can also be improved according to the present embodiment.

Additionally, terminal 200 transmits UCI, which is originally scheduled to be transmitted using a PUCCH resource, using a PUSCH resource indicated by DCI configured with UL-SCH indicator=0 and CSI request=0, that is, the PUSCH resource transmitting neither of UL-SCH nor CSI. This enables base station 100 to appropriately control the operation (e.g., the transmission of UL-SCH or UCI) of terminal 200 according to the relationship between the UL-SCH indicator and the CSI request indicated in DCI.

Variation 1 of Embodiment 1

Once transmission of P/SP-CSI is semi-statically requested from base station 100 to terminal 200, terminal 200 continues to transmit P/SP-CSI periodically or semi-persistently until the next semi-static indication opportunity. Thus, base station 100 cannot dynamically control the P/SP-CSI transmission from terminal 200. It is possible, however, that base station 100 does not need the P/SP-CSI transmitted from terminal 200.

Figure 11:
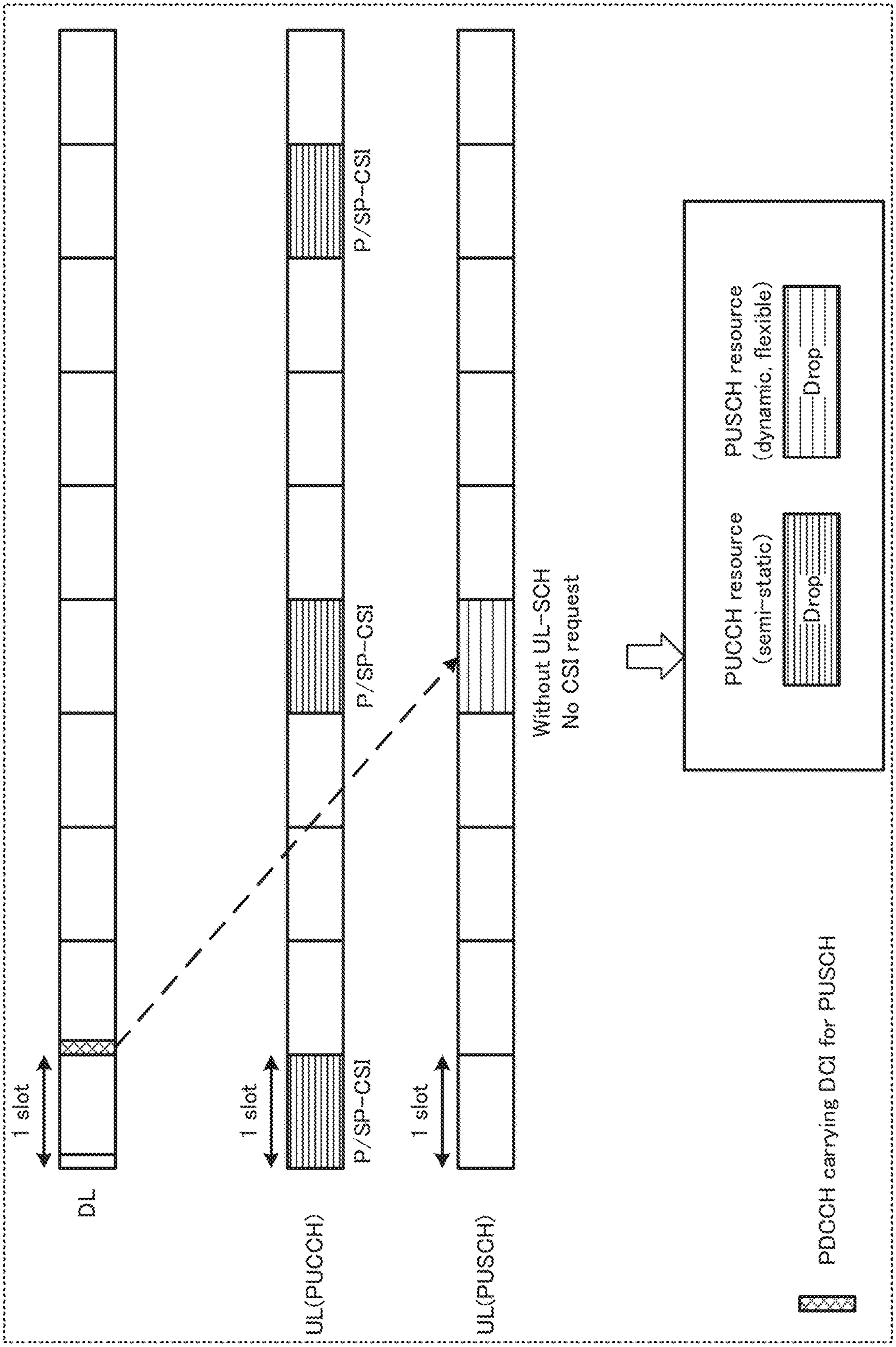
FIG. 11 illustrates an exemplary transmission of UCI according to a variation of Embodiment 1.

Then, in the variation of Embodiment 1, terminal 200 drops the P/SP-CSI transmission when UL-SCH indicator=0 and CSI request=0 are indicated in DCI, as illustrated in FIG. 11, in a case where UCI includes at least P/SP-CSI. In other words, terminal 200 does not perform transmission in a PUCCH resource and a PUSCH resource when the PUCCH resource for transmitting P/SP-CSI and the PUSCH resource overlap in time with each other, as illustrated in FIG. 11.

Figure 12:
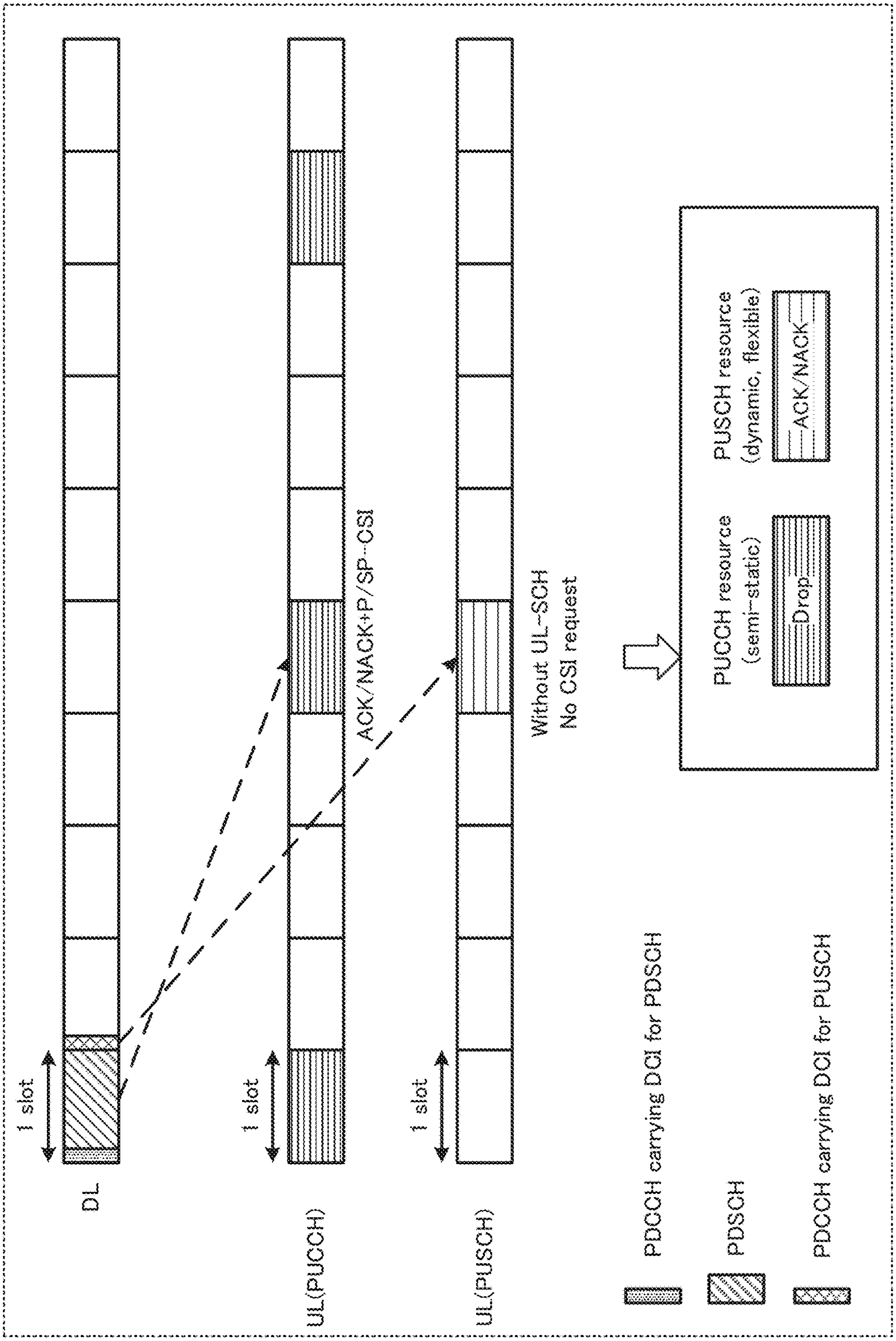
FIG. 12 illustrates another exemplary transmission of UCI according to the variation of Embodiment 1.

Note that the operation in FIG. 11 can be similarly applied to a case where UCI includes ACK/NACK and P/SP-CSI as illustrated in FIG. 9, for example, although FIG. 11 illustrates an example of a case where UCI includes only P/SP-CSI as illustrated in FIG. 8. For example, terminal 200 may drop the P/SP-CSI transmission when UL-SCH indicator=0 and CSI request=0 are indicated in DCI, as illustrated in FIG. 12. In other words, terminal 200 drops the P/SP-CSI transmission and transmits ACK/NACK using the PUSCH resource, as illustrated in FIG. 12.

This enables to temporarily stop the P/SP-CSI transmission in terminal 200 and improve the uplink resource utilization efficiency. In addition, dropping the P/SP-CSI transmission when UCI includes ACK/NACK and P/SP-CSI increases the resource to be allocated for ACK/NACK, thereby improving the received quality of ACK/NACK.

Embodiment 2

Descriptions will be given of a case where Carrier aggregation (CA) is applied to a terminal in the present embodiment.

A base station and a terminal according to the present embodiment have the same basic configurations as base station 100 and terminal 200 according to Embodiment 1, and thus FIGS. 5 and 6 will be used for the description.

In the case of CA, base station 100 can configure a plurality of Component Carriers (CCs; may be referred to as "carriers" or "cells") for terminal 200, and allocate PUSCH in each of the CCs.

Herein, terminal 200 multiplexes UCI on PUSCH in CC with the smallest CC index (or the CC number, e.g., ServCellIndex) among the plurality of CCs when PUCCH resources for transmitting UCI in the plurality of CCs overlap in time with each other (see, for example, NPL 3).

In addition, terminal 200 multiplexes UCI on PUSCH for which transmission starts earliest in time (i.e., PUSCH with the smallest symbol index for starting the PUSCH transmission) regardless of CA or non-CA, when a plurality of PUSCHs are allocated for a single CC, and a PUCCH resource transmitting UCI and the plurality of PUSCHs overlap in time with each other (see, for example, NPL 3).

Further, when PUSCH is allocated for each of a plurality of CCs, or when a plurality of PUSCHs are allocated for a single CC, DCI for allocating each PUSCH is configured with a UL-SCH indicator field and a CSI request field.

However, the relationship between the configurations of the UL-SCH indicator field and the CSI request field in the plurality of CCs and the operation in terminal 200 is unclear.

This may cause the following problems as examples.

Figure 13:
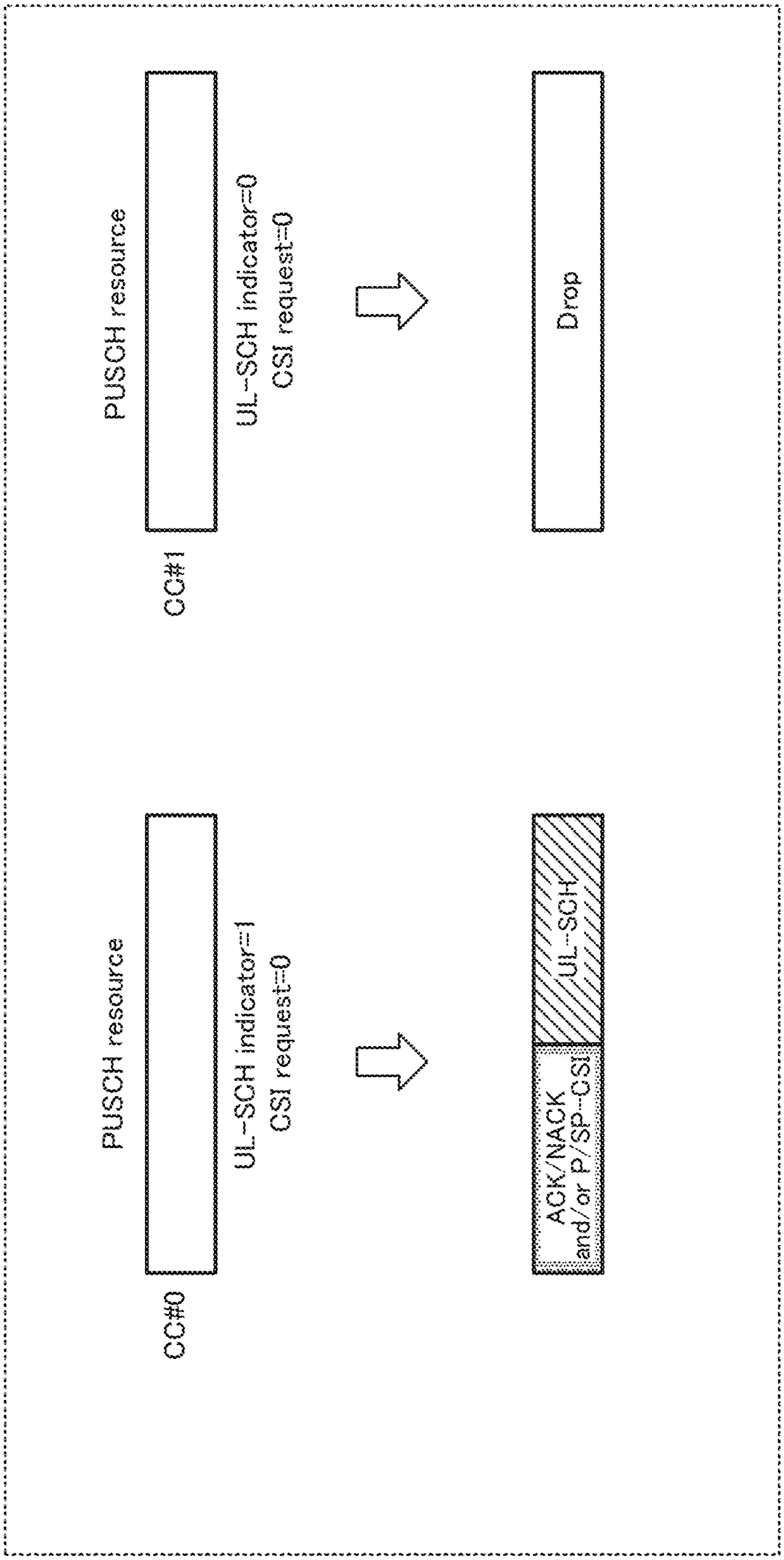
FIG. 13 illustrates an exemplary UCI transmission on PUSCH.

It is assumed that a PUSCH resource is allocated as illustrated in FIG. 13. The PUSCH resource is configured with UL-SCH indicator=1 and CSI request=0 in CC index 0 (CC #0), and with UL-SCH indicator=0 and CSI request=0 in CC index 1 (CC #1), for example.

In this case, UCI is multiplexed on PUSCH in CC #0 (CC with the smallest CC index) when a PUCCH resource for transmitting the UCI and the PUSCH resource overlap in time with each other, according to the above-described multiplexing method for UCI in a plurality of CCs. Thus, terminal 200 cannot use PUSCH in CC #1 in FIG. 13 even though PUSCH is allocated in CC #1. In addition, a part of the PUSCH resource in CC #0 is used for the UCI transmission when terminal 200 transmits UL-SCH using the PUSCH in CC #0 (i.e., the case of UL-SCH indicator=1) as illustrated in FIG. 13. This causes a risk of deteriorating the received quality of the UL-SCH.

Figure 14:
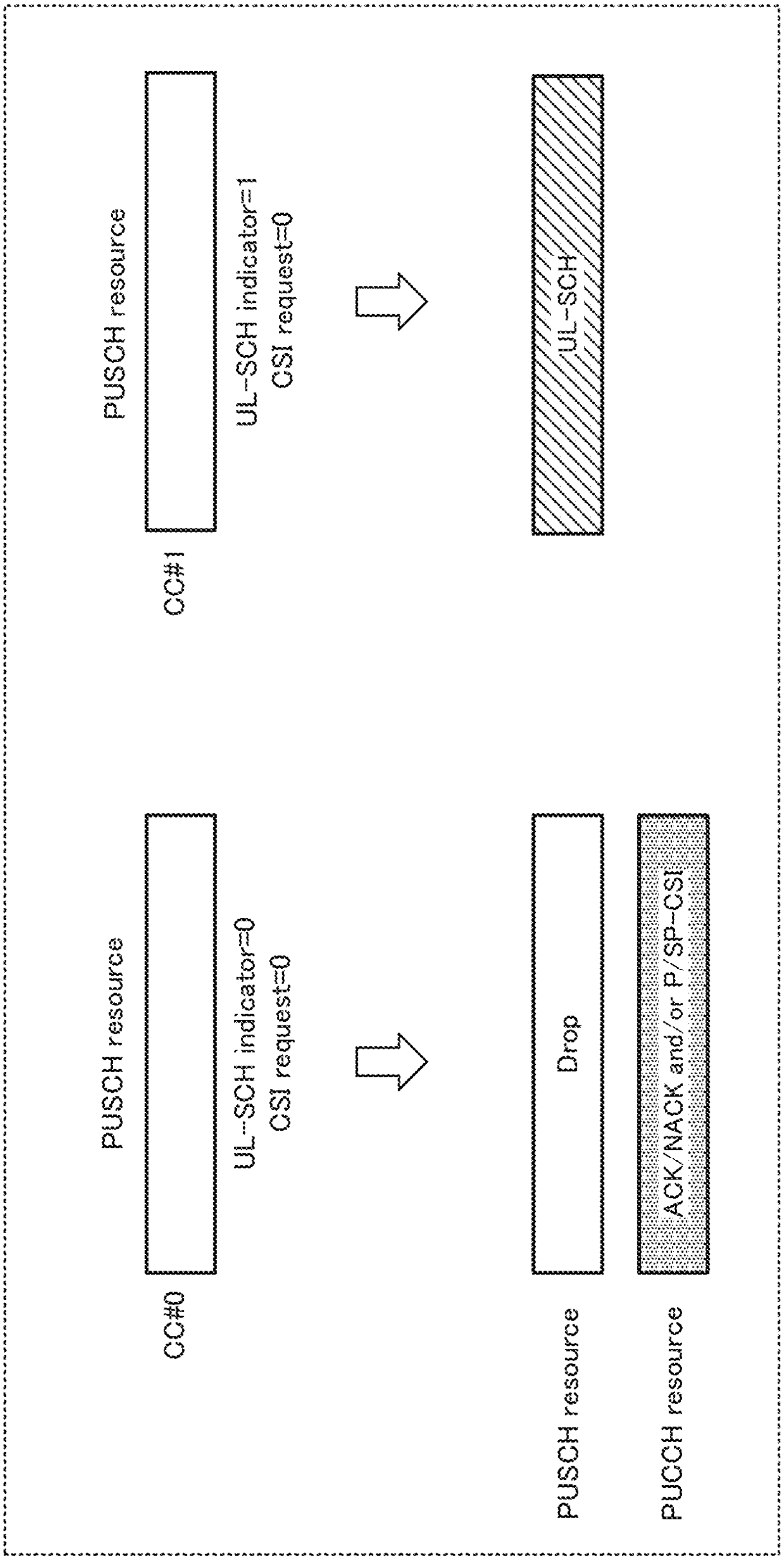
FIG. 14 illustrates another exemplary UCI transmission on PUSCH.

Herein, it is conceivable, for example, to configure UL-SCH indicator=0 in CC #0 and UL-SCH indicator=1 in CC #1 as illustrated in FIG. 14, as a method of preventing the deterioration of the received quality of UL-SCH described in FIG. 13. In the case of FIG. 14, terminal 200 can transmit UL-SCH using the PUSCH resource in CC #1 without UCI being multiplexed.

However, PUSCH configured with UL-SCH indicator=0 and CSI request=0 is allocated in CC #0 as illustrated in FIG. 14, and terminal 200 cannot transmit UCI in the PUSCH. Terminal 200 thus transmits the UCI on PUCCH in CC #0 (i.e., a resource semi-statically operated) in FIG. 14. Terminal 200, however, cannot follow a dynamic change of a channel state or a requirement in this case, and the received quality of the UCI is possibly deteriorated accordingly.

Figure 15:
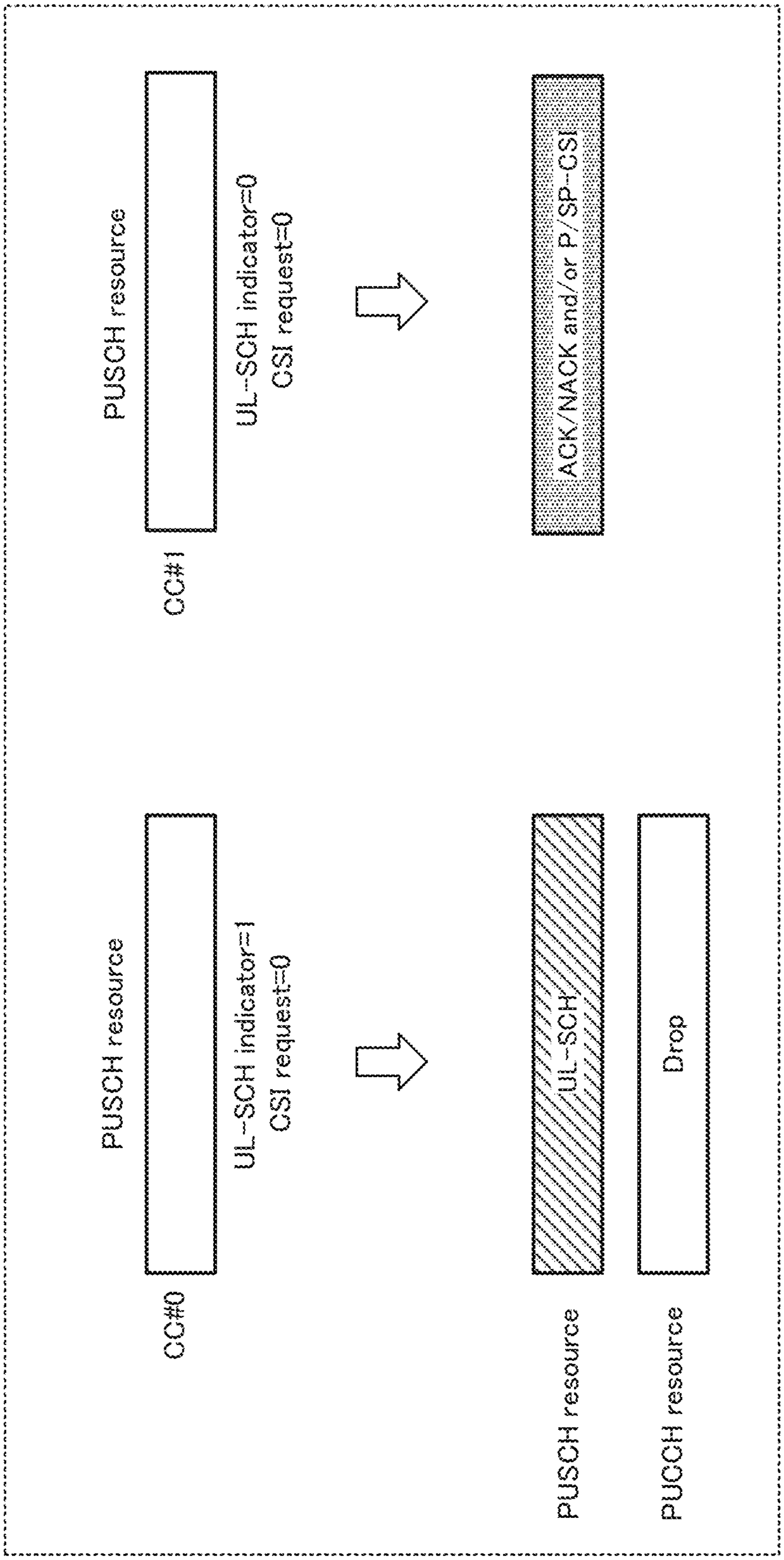
FIG. 15 illustrates an exemplary UCI transmission according to Embodiment 2.

In this regard, terminal 200 transmits UCI scheduled to be transmitted on PUCCH using a PUSCH resource in the present embodiment when the UL-SCH field and the CSI request field are configured for each of the plurality of CCs, a PUSCH resource configured with CSI request=0 is allocated for all the CCs, and the allocated PUSCH resource and a PUCCH resource allocated for transmitting UCI overlap (or partly overlap) in time with each other, as illustrated in FIG. 15.

Herein, the UCI scheduled to be transmitted on PUCCH includes, for example, at least either one of ACK/NACK to downlink data and P-CSI/SP-CSI.

Further, terminal 200 multiplexes the UCI on PUSCH in the CC configured with UL-SCH indicator=0 (CC #1 in FIG. 15) among the plurality of CCs configured for terminal 200, as illustrated in FIG. 15. In other words, terminal 200 transmits the UCI using a PUSCH resource to be allocated by DCI configured with UL-SCH indicator=0 and CSI request=0, as in Embodiment 1.

In FIG. 15, terminal 200 transmits UL-SCH (uplink data) using the PUSCH resource in CC #0 configured with UL-SCH indicator=1 and CSI request=0, and transmits UCI (at least either of ACK/NACK and P/SP-CSI) using the PUSCH resource in CC #1 configured with UL-SCH indicator=0 and CSI request=0.

As described above, the present embodiment enables to avoid the multiplex of UCI on PUSCH where terminal 200 transmits UL-SCH (the PUSCH resource in CC #0 in FIG. 15), thereby preventing the deterioration of the received quality of the UL-SCH. The present embodiment also enables base station 100 to dynamically allocate the PUSCH resource for transmitting UCI (the PUSCH resource in CC #1 in FIG. 15) following, for example, a change of a channel state, as is the case with Embodiment 1. Therefore, the received quality of UCI in base station 100 and the uplink resource utilization efficiency can be improved.

When UL-SCH indicator=0 is configured for a plurality of CCs, terminal 200 may multiplex UCI on PUSCH in CC with the smallest CC index among the plurality of CCs configured with UL-SCH indicator=0, for example. Note that CC for which the PUSCH resource to be used for the UCI transmission is allocated is not limited to the CC with the smallest CC index, and may be another CC.

In addition, when UL-SCH indicator=1 is configured for all of the plurality of CCs, terminal 200 may multiplex UCI on PUSCH transmitted in CC with the smallest CC index as with the method described in NPL 3, for example. Note that CC for which the PUSCH resource to be used for the UCI transmission is allocated is not limited to the CC with the smallest CC index, and may be another CC.

Further, when a plurality of PUSCHs are allocated in a single CC and a PUCCH resource for transmitting UCI and the plurality of PUSCHs overlap in time with each other, terminal 200 may multiplex the UCI on PUSCH for which transmission starts earliest in time (i.e., PUSCH with a smaller symbol index starting PUSCH transmission) among the PUSCHs in the CC configured with UL-SCH indicator=0. Note that PUSCH to be used for the UCI transmission is not limited to the PUSCH for which transmission starts earliest in time, and may be another PUSCH.

Embodiment 3

In the present embodiment, descriptions will be given of a case where a base station requests A/SP-CSI to terminal 200 using a CSI request field when CA is applied to the terminal.

The base station and the terminal according to the present embodiment have the same basic configurations as base station 100 and terminal 200 according to Embodiment 1, and thus FIGS. 5 and 6 will be used for the description.

In NR, terminal 200 does not expect to receive two or more CSI requests in a single slot. Thus, it is conceivable that the CSI request is configured to be non-zero in a certain CC and CSI request=0 is configured in the rest of the CCs when PUSCH is allocated for each of a plurality of CCs in CA and base station 100 requests CSI transmission on PUSCH.

However, the relationship between the configurations of the UL-SCH indicator field and the CSI request field among the plurality of CCs in this case and the operation in terminal 200 is unclear.

This may cause the following problems as examples.

Figure 16:
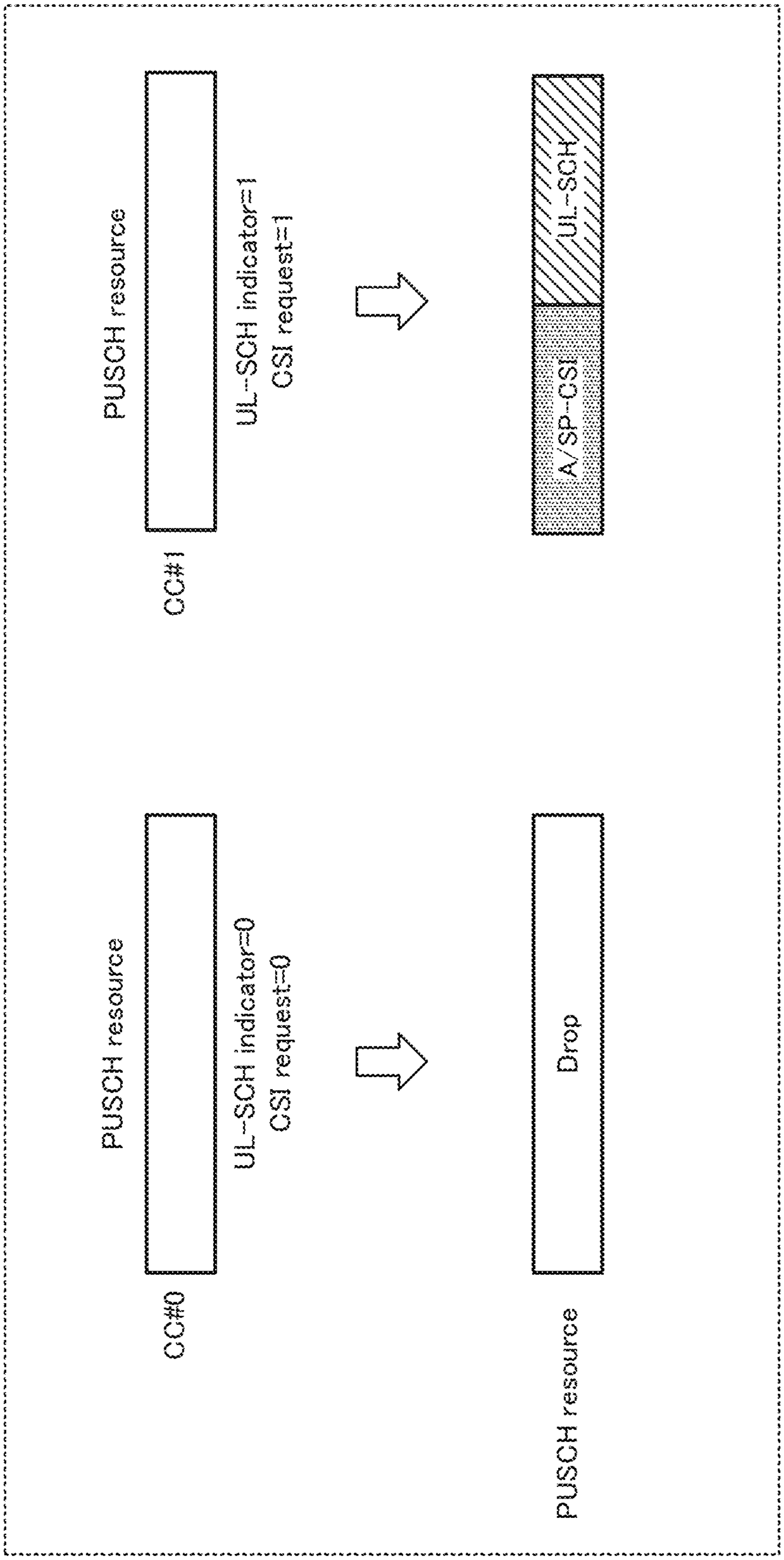
FIG. 16 illustrates an exemplary UCI transmission on PUSCH.

It is assumed that a PUSCH resource is allocated as illustrated in FIG. 16. The PUSCH resource is configured with UL-SCH indicator=0 and CSI request=0 in CC index 0 (CC #0), and with UL-SCH indicator=1 and CSI request=1 in CC index 1 (CC #1), for example.

A simple method in this case is a method where terminal 200 transmits A/SP-CSI required in CC #1 by multiplexing the A/SP-CSI on PUSCH in CC #1 as illustrated in FIG. 16.

In the case of FIG. 16, however, terminal 200 cannot use PUSCH in CC #0 even though PUSCH is allocated in CC #0. In addition, a part of the PUSCH resource in CC #1 is used for the UCI transmission while terminal 200 transmits UL-SCH using the PUSCH in CC #1, as illustrated in FIG. 16. This causes a risk of deteriorating the received quality of the UL-SCH.

Figure 17:
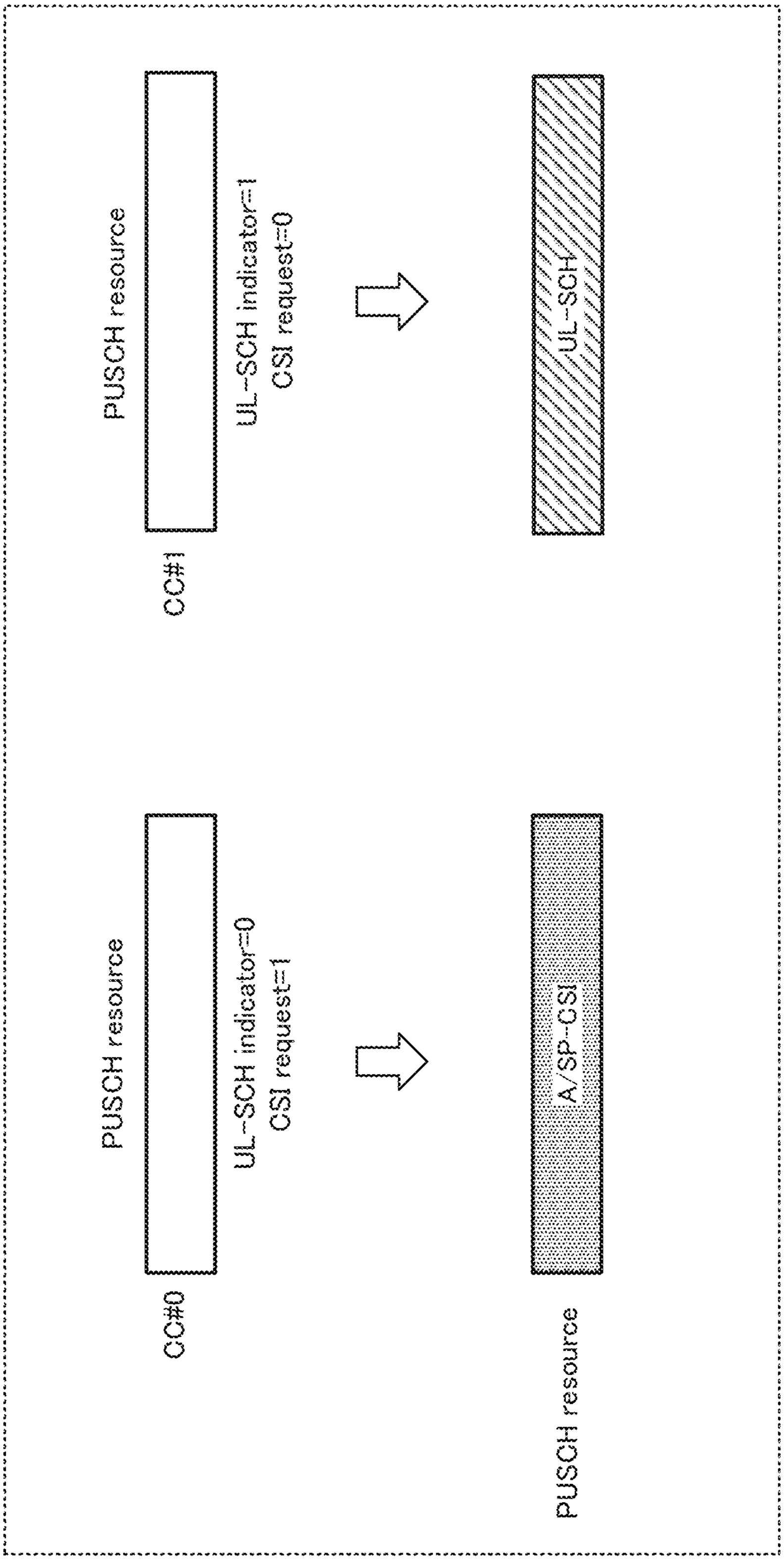
FIG. 17 illustrates another exemplary UCI transmission on PUSCH.

Herein, it is conceivable, for example, to configure UL-SCH indicator=0 and CSI request=1 in CC #0, and UL-SCH indicator=1 and CSI request=0 in CC #1 as illustrated in FIG. 17, as a method of preventing the deterioration of the received quality of UL-SCH described in FIG. 16. In the case of FIG. 17, terminal 200 can transmit UL-SCH using the PUSCH resource in CC #1 without UCI being multiplexed, and transmit A/SP-CSI using the PUSCH resource in CC #0.

Figure 18:
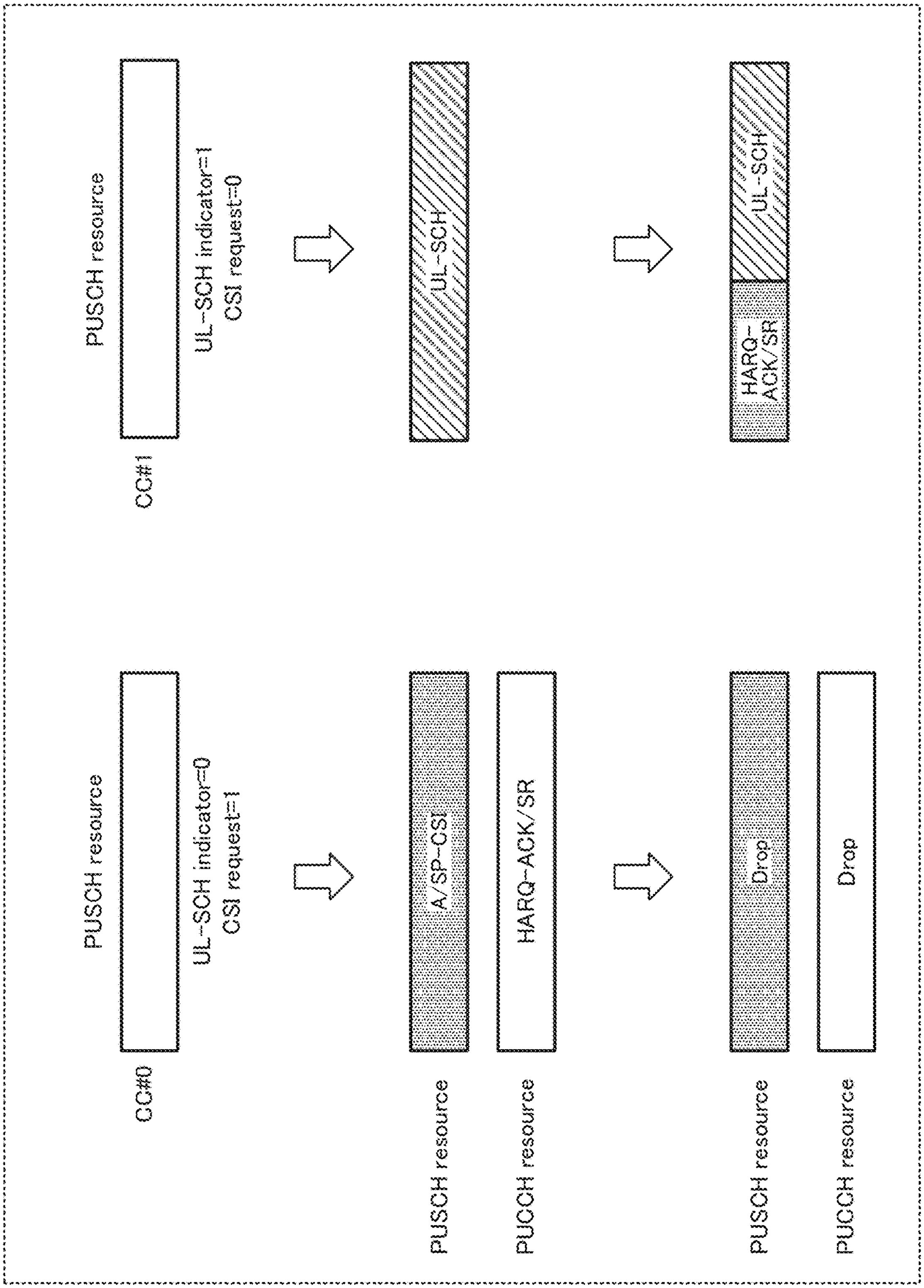
FIG. 18 illustrates still another exemplary UCI transmission on PUSCH.

In NR, however, terminal 200 drops PUSCH transmitting A/SP-CSI without UL-SCH as illustrated in FIG. 18 when the PUSCH resource for transmitting A/SP-CSI and a PUCCH resource for transmitting ACK/NACK or SR overlap in time with each other (see NPL 3, for example). Thus, terminal 200 cannot transmit A/SP-CSI in FIG. 18.

In addition, the ACK/NACK or SR is transmitted by being multiplexed on PUSCH in CC #1 as illustrated in FIG. 18. Thus, a part of the PUSCH resource is used for the transmission of the ACK/NACK or SR in FIG. 18, thereby causing a risk of deteriorating the received quality of UL-SCH.

In this regard, descriptions will be given of methods of appropriately transmitting A/SP-CSI (i.e., CSI requested by a CSI request) and ACK/NACK or SR (i.e., UCI allocated for PUCCH) without deteriorating the received quality of UL-SCH, in the present embodiment.

Figure 19:
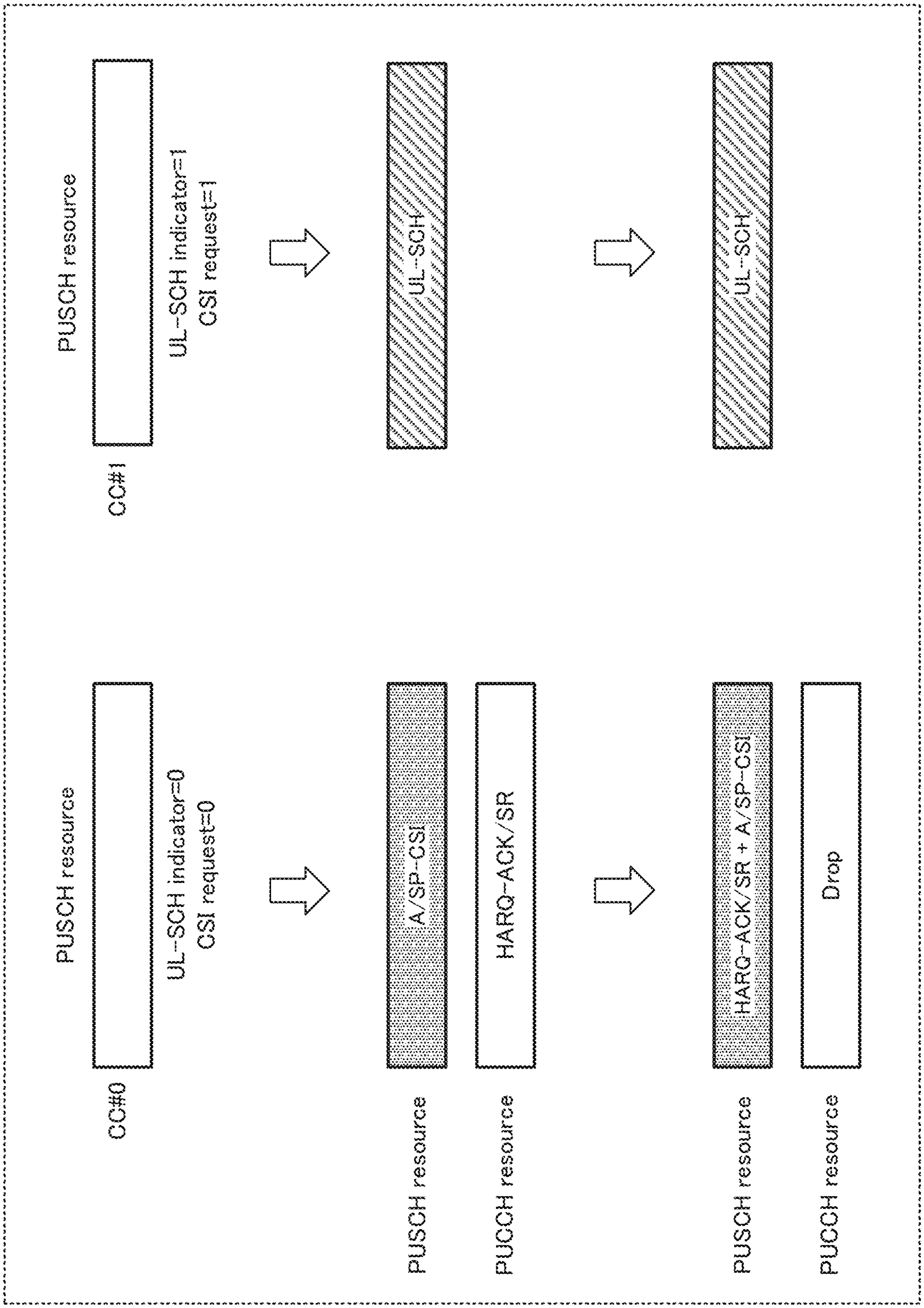
FIG. 19 illustrates an exemplary UCI transmission according to Embodiment 3.

For example, it is assumed that a PUSCH resource is allocated as illustrated in FIG. 19. The PUSCH resource is configured with UL-SCH indicator=0 and CSI request=0 in CC index 0 (CC #0), and with UL-SCH indicator=1 and CSI request=1 in CC index 1 (CC #1), as is the case with FIG. 16.

Terminal 200 transmits A/SP-CSI by multiplexing the A/SP-CSI on PUSCH in CC #0 configured with UL-SCH indicator=0 when the UL-SCH indicator field and the CSI request field are configured for each of the plurality of CCs and the CSI request is requested as illustrated in FIG. 19.

Further, terminal 200 transmits ACK/NACK (or SR) by multiplexing the ACK/NACK (or SR) on the PUSCH in CC #0 configured with UL-SCH indicator=0 when the PUSCH resource on which A/SP-CSI is multiplexed overlaps (or partly overlaps) in time with a PUCCH resource for transmitting ACK/NACK (or SR), as illustrated in FIG. 19. In other words, terminal 200 transmits the UCI using the PUSCH resource to be allocated by DCI configured with UL-SCH indicator=0 and CSI request=0, as in Embodiment 1.

Thus, in FIG. 19, terminal 200 multiplexes and transmits ACK/NACK (or SR) and A/SP-CSI using the PUSCH resource in CC #0, and transmits UL-SCH using the PUSCH resource in CC #1.

As described above, the present embodiment enables to avoid the multiplex of UCI (e.g., ACK/NACK or A/SP-CSI) on PUSCH where terminal 200 transmits UL-SCH, thereby preventing the deterioration of the received quality of the UL-SCH. The present embodiment also enables base station 100 to dynamically allocate the PUSCH resource for transmitting UCI (the PUSCH resource in CC #0 in FIG. 19) following, for example, a change of a channel state, as is the case with Embodiment 1. Therefore, the received quality of the UCI in base station 100 and the uplink resource utilization efficiency can be improved.

Figure 20:
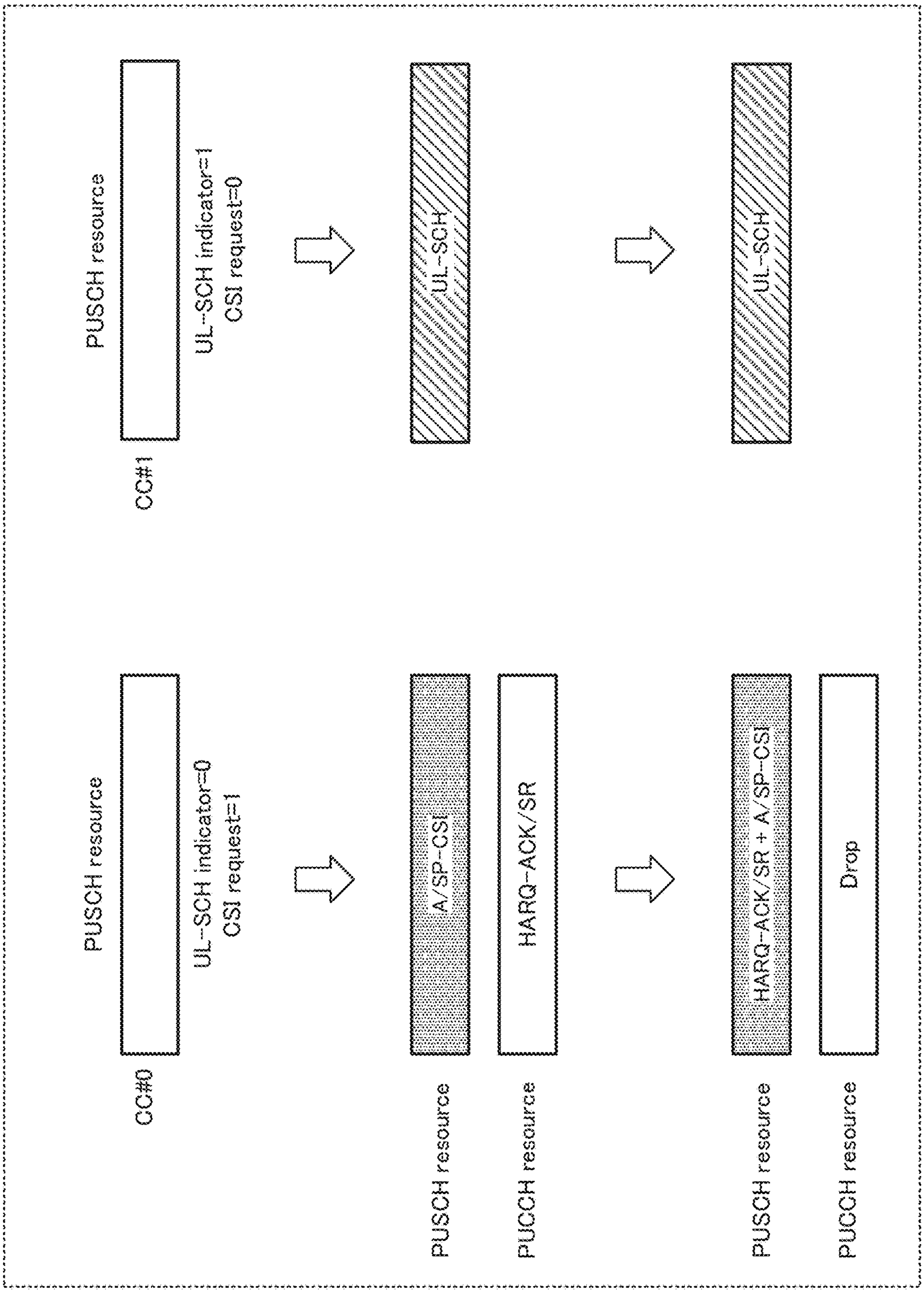
FIG. 20 illustrates another exemplary UCI transmission according to Embodiment 3.

Note that the configurations of the UL-SCH indicator and the CSI request in the present embodiment are not limited to the example in FIG. 19. For example, it is assumed that a PUSCH resource is allocated as illustrated in FIG. 20. The PUSCH resource is configured with UL-SCH indicator=0 and CSI request=1 in CC index 0 (CC #0), and with UL-SCH indicator=1 and CSI request=0 in CC index 1 (CC #1).

Terminal 200 may also transmit A/SP-CSI by multiplexing the A/SP-CSI on the PUSCH in CC #0 configured with UL-SCH indicator=0 in the case of FIG. 20. Further, terminal 200 transmits ACK/NACK (or SR) by multiplexing the ACK/NACK (or SR) on the PUSCH in the CC configured with UL-SCH indicator=0 when the PUSCH resource on which A/SP-CSI is multiplexed overlaps (or partly overlaps) in time with a resource for which PUCCH transmitting ACK/NACK (or SR) is allocated, as illustrated in FIG. 20. Thus, in FIG. 20, terminal 200 multiplexes and transmits ACK/NACK (or SR) and A/SP-CSI using the PUSCH resource in CC #0, and transmits UL-SCH using the PUSCH resource in CC #1, as in FIG. 19. Therefore, the received quality of UCI in base station 100 and the uplink resource utilization efficiency can also be improved in the case of FIG. 20.

When UL-SCH indicator=0 is configured for a plurality of CCs, terminal 200 may multiplex UCI on PUSCH in CC with the smallest CC index among the plurality of CCs configured with UL-SCH indicator=0, for example. Note that CC for which the PUSCH resource to be used for the UCI transmission is allocated is not limited to the CC with the smallest CC index, and may be another CC.

In addition, when UL-SCH indicator=1 is configured for all of the plurality of CCs, terminal 200 may multiplex UCI on PUSCH transmitted in CC with the smallest CC index as with the method described in NPL 3, for example. Alternatively, terminal 200 may multiplex UCI on PUSCH transmitted in CC where the CSI request is configured to be non-zero. Note that CC for which the PUSCH resource to be used for the UCI transmission is allocated is not limited to the CC with the smallest CC index, and may be another CC.

Further, when a plurality of PUSCHs are allocated for a single CC and a PUCCH resource for transmitting UCI and the plurality of PUSCHs overlap in time with each other, terminal 200 may multiplex the UCI on PUSCH for which transmission starts earliest in time (i.e., PUSCH with a smaller symbol index starting PUSCH transmission) among the PUSCHs in the CC configured with UL-SCH indicator=0. Note that PUSCH to be used for the UCI transmission is not limited to the PUSCH for which transmission starts earliest in time, and may be another PUSCH.

Embodiment 4

In Embodiments 1 to 3 above, descriptions have been given of the case where UL-SCH indicator=0 and CSI request=0 are indicated in DCI as the indication of no UL-SCH transmission on PUSCH and no CSI report request from a base station.

The indication of no UL-SCH transmission on PUSCH and no CSI report request from a base station is not limited to the configuration of the DCI described above, however.

In the present embodiment, another indication method by the DCI for the case of no UL-SCH transmission on PUSCH and no CSI report request from a base station will be described.

A base station and a terminal according to the present embodiment have the same basic configurations as base station 100 and terminal 200 according to Embodiment 1, and thus FIGS. 5 and 6 will be used for the description.

For example, a CSI request field included in DCI format 0-1 may indicate (i.e., trigger) monitoring of an aperiodic response signal for beam forming control (A-CSI; e.g., a response signal for CSI measurement) from the base station to the terminal. The CSI request field may also indicate (i.e., trigger) from the base station to the terminal that an aperiodic response signal for following a channel is monitored, for example.

In this case, reportQuantity=none is indicated to the terminal by UE-specific higher layer signaling. The reportQuantity here as a higher-layer parameter is indication information indicating information to be actually transmitted when the terminal is requested to transmit CSI by the CSI request field.

Herein, the terminal determines that no UL-SCH transmission is on PUSCH and no CSI report request is made from the base station when UL-SCH indicator=0 and CSI request=non-zero are indicated in DCI, the CSI request=non-zero corresponds to the reportQuantity, and reportQuantity=none is configured by higher-layer signaling.

At this time, the terminal conceivably transmits UCI such as ACK/NACK to downlink data (e.g., PDSCH) not on PUSCH but on PUCCH when UL-SCH indicator=0 and CSI request=non-zero are indicated in the same time resource as (or a time resource partly overlapping with) a slot (or a mini-slot) for which PUCCH for transmitting the UCI (e.g., ACK/NACK) is allocated, and a PUSCH resource configured with reportQuantity=none is allocated, for example.

The allocation of a radio resource for PUCCH (a PUCCH resource), however, is operated semi-statically. The semi-static allocation of the PUCCH resource cannot follow a dynamic change of a channel state or a requirement, and thus the radio resource may not be used effectively. For example, when the channel state of the semi-statically allocated PUCCH resource is deteriorated by the influence of channel fluctuation or inter-cell interference, the UCI transmission on PUCCH by the terminal may cause the received quality of the UCI to be deteriorated. The deterioration of the received quality of the UCI possibly causes influence on system optimization and causes deterioration of system throughput.

Thus, in the present embodiment, terminal 200 transmits UCI scheduled to be transmitted in the PUCCH resource, using a PUSCH resource when terminal 200 is allocated the PUSCH resource configured with UL-SCH indicator=0 and CSI request=non-zero, and also with reportQuantity=none, and the PUSCH resource and the PUCCH resource allocated for transmitting the UCI overlap (or partly overlap) in time with each other.

A PUSCH resource is dynamically allocated while a PUCCH resource is semi-statically allocated as described above. Thus, base station 100 can dynamically allocate the PUSCH resource for transmitting UCI following a change of a channel state between base station 100 and terminal 200, or the like, as in Embodiment 1. This improves the received quality of the UCI in base station 100 and also improves the uplink resource utilization efficiency.

Therefore, terminal 200 can appropriately transmit UCI according to the present embodiment. For example, the received quality of UCI in base station 100 can be improved and the uplink resource utilization efficiency can also be improved according to the present embodiment.

Note that the UCI in the present embodiment may include either one of ACK/NACK to downlink data and P/SP-CSI, or both of ACK/NACK to downlink data and P/SP-CSI.

Embodiment 5

A base station and a terminal according to the present embodiment have the same basic configurations as base station 100 and terminal 200 according to Embodiment 1, and thus FIGS. 5 and 6 will be used for the description.

In the present embodiment, in a case where UCI includes at least P/SP-CSI, terminal 200 drops transmission of the P/SP-CSI when terminal 200 is allocated the PUSCH resource configured with UL-SCH indicator=0 and CSI request=non-zero, and also with reportQuantity=none, and the PUSCH resource and the PUCCH resource allocated for transmitting the UCI overlap (or partly overlap) in time with each other.

In a case where UCI includes ACK/NACK to downlink data, in contrast, terminal 200 transmits the ACK/NACK to downlink data scheduled to be transmitted in a PUCCH resource using a PUSCH resource, similar to the operation in Embodiment 4.

This enables to temporarily stop the P/SP-CSI transmission in terminal 200 and improve the uplink resource utilization efficiency. Further, when UCI includes ACK/NACK and P/SP-CSI, dropping the P/SP-CSI transmission in terminal 200 increases the resource to be allocated for the ACK/NACK, thereby improving the received quality of the ACK/NACK.

Embodiment 6

In the present embodiment, a case where CA is applied to a terminal will be described.

A base station and a terminal according to the present embodiment have the same basic configurations as base station 100 and terminal 200 according to Embodiment 1, and thus FIGS. 5 and 6 will be used for the description.

Terminal 200 transmits UCI scheduled to be transmitted on PUCCH, using a PUSCH resource when a UL-SCH field and a CSI request field are configured for each of a plurality of CCs, no CSI report request is made from base station 100 in all the CCs, and the allocated PUSCH resource and a PUCCH resource allocated for transmitting the UCI overlap (or partly overlap) in time with each other, for example. The case where no CSI report request is made from base station 100 here includes, for example, the case of CSI request=0 described in Embodiments 1 to 3, or the case of CSI request=non-zero where the CSI request=non-zero corresponds to reportQuantity, and reportQuantity=none is configured by higher-layer signaling, described in Embodiment 4 or 5.

Herein, the UCI scheduled to be transmitted on PUCCH includes at least either one of ACK/NACK to downlink data and P-CSI/SP-CSI, for example.

Further, terminal 200 multiplexes UCI on PUSCH in CC configured with UL-SCH indicator=0 among a plurality of CCs configured for terminal 200.

As described above, the present embodiment enables to avoid the multiplex of UCI on PUSCH where terminal 200 transmits UL-SCH, thereby preventing the deterioration of the received quality of the UL-SCH. The present embodiment also enables base station 100 to dynamically allocate the PUSCH resource for transmitting UCI following, for example, a change of a channel state, as is the case with Embodiment 1. Therefore, the received quality of the UCI in base station 100 and the uplink resource utilization efficiency can be improved.

When UL-SCH indicator=0 is configured for a plurality of CCs, terminal 200 may multiplex UCI on PUSCH in CC with the smallest CC index among the plurality of CCs configured with UL-SCH indicator=0, for example. Note that CC for which the PUSCH resource to be used for the UCI transmission is allocated is not limited to the CC with the smallest CC index, and may be another CC. For example, when there are CCs configured with CSI request=0 and CSI request=non-zero respectively, terminal 200 may multiplex UCI on PUSCH in the CC configured with CSI request=0. Alternatively, terminal 200 may multiplex UCI on PUSCH in the CC configured with CSI request=non-zero the other way around.

In addition, when UL-SCH indicator=1 is configured for all of the plurality of CCs, terminal 200 may multiplex UCI on PUSCH transmitted in CC with the smallest CC index as with the method described in NPL 3, for example. Note that CC for which the PUSCH resource to be used for the UCI transmission is allocated is not limited to the CC with the smallest CC index, and may be another CC.

Further, when a plurality of PUSCHs are allocated for a single CC and a PUCCH resource for transmitting UCI and the plurality of PUSCHs overlap in time with each other, terminal 200 may multiplex the UCI on PUSCH for which transmission starts earliest in time (i.e., PUSCH with a smaller symbol index starting PUSCH transmission) among the PUSCHs in the CC configured with UL-SCH indicator=0. Note that PUSCH to be used for the UCI transmission is not limited to the PUSCH for which transmission starts earliest in time, and may be another PUSCH.

Each embodiment of the present disclosure has been described, thus far.

The embodiments described above enable terminal 200 to transmit UCI on PUSCH, originally scheduled to be transmitted on PUCCH, when UL-SCH indicator=0 and CSI request=0 are indicated in DCI. The embodiments described above also enable terminal 200 to transmit UCI on PUSCH, originally scheduled to be transmitted on PUCCH, when UL-SCH indicator=0, CSI request=non-zero, and reportQuantity=none are configured in DCI. The ambiguity of the relationship between the UL-SCH indicator field and the CSI request field can also be eliminated by not allowing base station 100 to configure UL-SCH indicator=0 and CSI request=0 in a specification, however. At this time, terminal 200 does not expect the indication of UL-SCH indicator=0 and CSI request=0 in DCI for allocating PUSCH. Similarly, the specification need not allow base station 100 to configure UL-SCH indicator=0 and CSI request=non-zero in DCI, when reportQuantity=none is configured. This case enables to simplify the implementation of terminal 200.

Further, in the embodiments described above, descriptions have been given of the case of transmitting UCI using a PUSCH resource when a PUCCH resource for transmitting the UCI and the PUSCH resource allocated by DCI configured with UL-SCH indicator=0 and CSI request=0 overlap in time with each other. In the present disclosure, however, terminal 200 may also transmit UCI using the PUSCH resource when the PUCCH resource for transmitting the UCI and the PUSCH resource allocated by DCI configured with UL-SCH indicator=0 and CSI request=0 do not overlap in time with each other.

Further, the present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A terminal according to the present disclosure includes: a receiver, which in operation, receives first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and a transmitter, which in operation, transmits the uplink control information using a resource for the uplink data channel, when the first indication information indicates the absence of the transmission of the uplink data and the second indication information indicates the absence of the transmission of the channel state information.

In the terminal according to an embodiment of the present disclosure, the resource for the uplink data channel is a resource overlapping in time with a resource for the uplink control channel.

In the terminal according to an embodiment of the present disclosure, the terminal is configured with a plurality of component carriers, and the transmitter transmits the uplink control information using the resource for the uplink data channel when the first indication information and the second indication information are configured for each of the plurality of component carriers and the second indication information indicates the absence of the transmission of the channel state information in all of the plurality of component carriers.

In the terminal according to an embodiment of the present disclosure, the resource for the uplink data channel is a resource overlapping in time with a resource for the uplink control channel.

In the terminal according to an embodiment of the present disclosure, the resource for the uplink data channel is a resource in one or more of the plurality of component carriers where the first indication information indicates the absence of the transmission of the uplink data.

In the terminal according to an embodiment of the present disclosure, the resource for the uplink data channel is a resource in at least one of the plurality of component carriers with a smallest component carrier number among the one or more of the plurality of component carriers where the first indication information indicates the absence of the transmission of the uplink data.

In the terminal according to an embodiment of the present disclosure, the resource for the uplink data channel is a resource for an uplink data channel for which transmission starts earliest in time, among a plurality of the uplink data channels in the one or more of the plurality of component carriers where the first indication information indicates the absence of the transmission of the uplink data.

In the terminal according to an embodiment of the present disclosure, the terminal is configured with a plurality of component carriers, and the transmitter multiplexes and transmits the uplink control information and the channel state information using the resource for the uplink data channel in one or more of the plurality of component carriers where the first indication information indicates the absence of the transmission of the uplink data, when the first indication information and the second indication information are configured in each of the plurality of component carriers and the second indication information in at least one of the plurality of component carriers indicates the presence of the transmission of the channel state information.

In the terminal according to an embodiment of the present disclosure, the resource for the uplink data channel is a resource in one or more of the plurality of component carriers where the second indication information indicates the absence of the transmission of the channel state information.

In the terminal according to an embodiment of the present disclosure, the resource for the uplink data channel is a resource in at least one of the plurality of component carriers with a smallest component carrier number among the one or more of the plurality of component carriers where the first indication information indicates the absence of the transmission of the uplink data.

In the terminal according to an embodiment of the present disclosure, the resource for the uplink data channel is a resource for an uplink data channel for which transmission starts earliest in time, among a plurality of the uplink data channels in the one or more of the plurality of component carriers where the first indication information indicates the absence of the transmission of the uplink data.

In the terminal according to an embodiment of the present disclosure, the uplink control information includes at least one of a response signal to downlink data and the channel state information.

A base station according to the present disclosure includes: a transmitter, which in operation, transmits first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and a receiver, which in operation, receives the uplink control information to be transmitted using a resource for the uplink data channel, when the first indication information indicates the absence of the transmission of the uplink data and the second indication information indicates the absence of the transmission of the channel state information.

A communication method according to the present disclosure includes: receiving first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and transmitting the uplink control information using a resource for the uplink data channel, when the first indication information indicates the absence of the transmission of the uplink data and the second indication information indicates the absence of the transmission of the channel state information.

A communication method according to the present disclosure includes: transmitting first control information related to an uplink data channel and second control information related to an uplink control channel for transmitting uplink control information, wherein the first control information includes first indication information indicating presence or absence of transmission of uplink data and second indication information indicating presence or absence of transmission of channel state information; and receiving the uplink control information to be transmitted using a resource for the uplink data channel, when the first indication information indicates the absence of the transmission of the uplink data and the second indication information indicates the absence of the transmission of the channel state information.

The disclosures of Japanese Patent Applications No. 2018-139337 and No. 2018-202046, filed on Jul. 25, 2018, and Oct. 26, 2018, respectively, including the specifications, drawings, and abstracts are incorporated herein by reference in their entirety.

INDUSTRIAL APPLICABILITY

One exemplary embodiment of the present disclosure is useful in mobile communication systems.

REFERENCE SIGNS LIST

100 Base station
101, 211 Controller
102 Data generator
103, 107, 110, 212, 214, 216 Encoder
104 Retransmission controller
105, 108, 111, 213, 215, 217 Modulator
106 Higher-layer control signal generator
109 Downlink control signal generator
112, 218 Signal assigner
113, 219 Inverse Fast Fourier Transformer (IFFT)
114, 220 Transmitter
115, 201 Antenna
116, 202 Receiver
117, 203 Fast Fourier Transformer (FFT)
118, 204 Extractor
119 ACK/NACK Demodulator
120, 123, 126 Decoder
121, 124, 127 Determiner
122 CSI Demodulator
125 UL-SCH Demodulator
200 Terminal
205 Downlink control signal demodulator
206, 208, 210 Decoder
207 Higher-layer control signal demodulator
209 Data demodulator

The invention claimed is:

1. An integrated circuit for a user equipment, the integrated circuit comprising:

at least one input, which, in operation, inputs an electronic signal, and controller circuitry, which, in operation, controls:

receiving downlink control information (DCI) including uplink shared channel (UL-SCH) indicator information and channel state information (CSI) request information;

setting a physical uplink shared channel (PUSCH) based on the UL-SCH indicator information set to 0 and the CSI request information set to 0; and transmitting acknowledge (ACK) information using the PUSCH, wherein the ACK information is a part of uplink control information (UCI);

wherein the UL-SCH indicator information is set to 0 in the DCI activating semi-persistent CSI reporting on PUSCH.

2. The integrated circuit according to claim 1, wherein the control circuitry, in operation, does not expect to receive the DCI in which the UL-SCH indicator information indicates no UL-SCH transmission on PUSCH and the CSI request information indicates no CSI is requested.

3. The integrated circuit according to claim 1, wherein the controller circuitry, in operation, controls multiplexing the ACK information on the PUSCH when a physical uplink control channel (PUCCH) transmission allocated to transmit the UCI overlaps with a PUSCH transmission.

4. The integrated circuit according to claim 1, wherein the controller circuitry, in operation, sets a timing of transmission of the ACK information based on the UL-SCH indicator information set to 0 and the CSI request information set to 0; and the ACK information is transmitted based on the timing.

* * * * *